United States Patent
Tsai et al.

(10) Patent No.: US 12,372,834 B2
(45) Date of Patent: Jul. 29, 2025

(54) ELECTRONIC DISPLAY DEVICE COMPRISING A FIRST DISPLAY REGION OVERLAPPING WITH A PHOTOSENSOR

(71) Applicant: Innolux Corporation, Miaoli County (TW)

(72) Inventors: Chia-Hao Tsai, Miaoli County (TW); Yung-Hsun Wu, Miaoli County (TW); Yu-Shih Tsou, Miaoli County (TW); En Jie Chen, Miaoli County (TW); Ming-Jou Tai, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/629,959

(22) Filed: Apr. 9, 2024

(65) Prior Publication Data
US 2024/0255814 A1 Aug. 1, 2024

Related U.S. Application Data

(63) Continuation of application No. 17/088,540, filed on Nov. 3, 2020, now abandoned.
(Continued)

(30) Foreign Application Priority Data

Sep. 2, 2020 (CN) .......................... 202010909770.3

(51) Int. Cl.
*G02F 1/1343* (2006.01)
*F21V 8/00* (2006.01)
(Continued)

(52) U.S. Cl.
CPC ...... *G02F 1/134336* (2013.01); *G02B 6/0011* (2013.01); *G02F 1/13306* (2013.01);
(Continued)

(58) Field of Classification Search
CPC ...................... G09G 2300/0456; G02B 6/0058
See application file for complete search history.

(56) References Cited

U.S. PATENT DOCUMENTS

| 2004/0046725 | A1* | 3/2004 | Lee | G09G 3/3607 345/88 |
| 2007/0058113 | A1* | 3/2007 | Wu | H04N 13/31 349/106 |
| 2007/0195231 | A1* | 8/2007 | Kuribayashi | G02F 1/133514 349/106 |

FOREIGN PATENT DOCUMENTS

| CN | 108881530 | 11/2018 | |
| CN | 108881530 A | * 11/2018 | .......... H04M 1/0264 |

(Continued)

OTHER PUBLICATIONS

"Office Action of China Counterpart Application", issued on Jul. 31, 2024, p. 1-p. 7.

*Primary Examiner* — Paul C Lee
(74) *Attorney, Agent, or Firm* — JCIPRNET

(57) ABSTRACT

The disclosure provides an electronic device. The electronic device includes a photosensor and a display panel. The display panel is disposed on the photosensor and includes a first display region and a second display region. The first display region overlaps the photosensor in a top view. The second display region is disposed adjacent to the first display region. The first display region has first display sub-pixels. The second display region has second display sub-pixels. Each of the first display sub-pixels includes only one color LED, and each of second display sub-pixels includes only one color LED. A size of one of the first display sub-pixels is greater than a size of one of the second display sub-pixels, and a gap between two adjacent ones of the first display sub-pixels is greater than a gap between two adjacent ones of the second display sub-pixels in a first direction.

19 Claims, 12 Drawing Sheets

Related U.S. Application Data

(60) Provisional application No. 62/938,955, filed on Nov. 22, 2019.

(51) Int. Cl.
    *G02F 1/133*     (2006.01)
    *G02F 1/1335*     (2006.01)
    *G02F 1/13357*     (2006.01)
    *G02F 1/1362*     (2006.01)
    *G02F 1/1368*     (2006.01)
    *G09G 3/20*     (2006.01)
    *H04N 23/57*     (2023.01)
    *H04N 23/73*     (2023.01)

(52) U.S. Cl.
    CPC .. *G02F 1/133606* (2013.01); *G02F 1/136286* (2013.01); *G09G 3/20* (2013.01); *H04N 23/57* (2023.01); *H04N 23/73* (2023.01); *G02F 1/133512* (2013.01); *G02F 1/133514* (2013.01); *G02F 1/134345* (2021.01); *G02F 1/1368* (2013.01)

(56) References Cited

FOREIGN PATENT DOCUMENTS

| CN | 109755282 | 5/2019 | |
| CN | 109755282 A * | 5/2019 | ......... H01L 27/3216 |

* cited by examiner

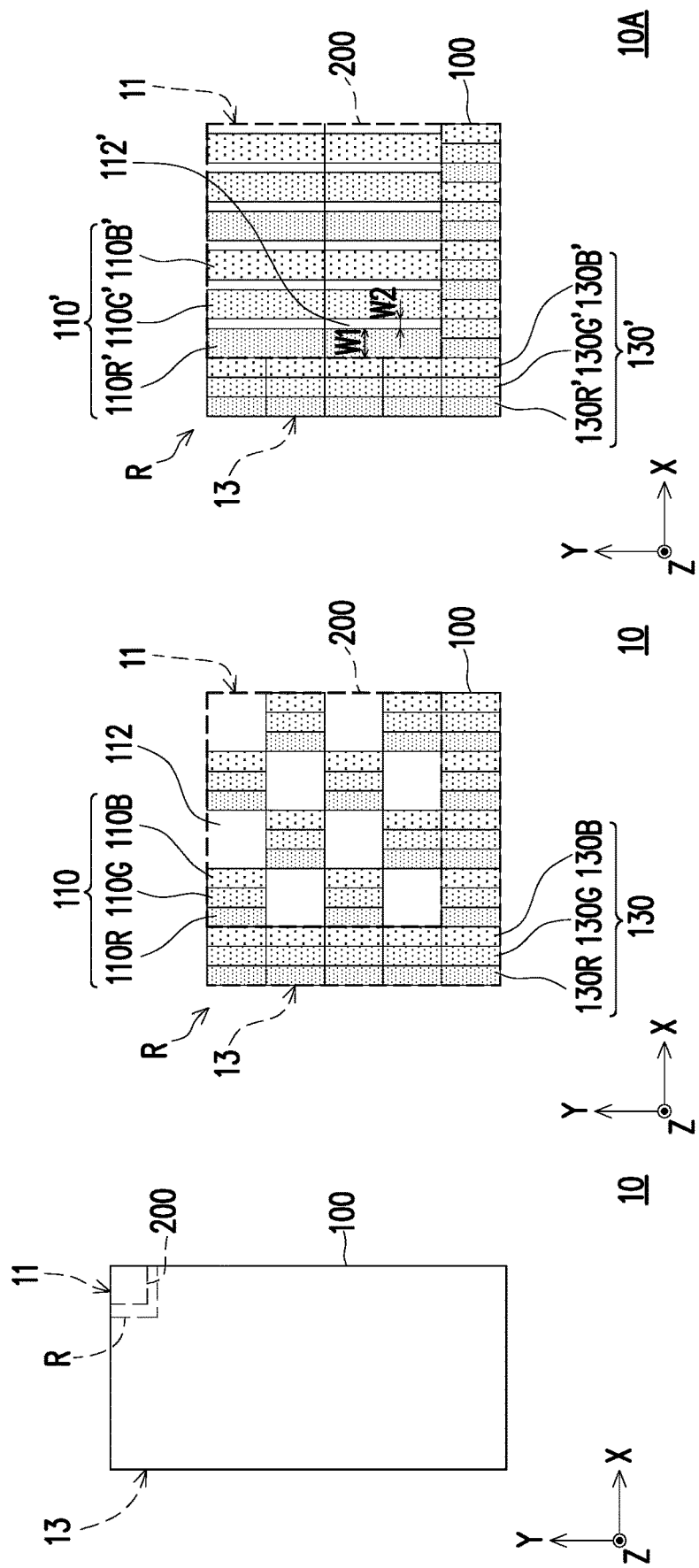

ELECTRONIC DISPLAY DEVICE COMPRISING A FIRST DISPLAY REGION OVERLAPPING WITH A PHOTOSENSOR

CROSS-REFERENCE TO RELATED APPLICATION

This application is a continuation application of and claims the priority benefit of a prior application Ser. No. 17/088,540, filed on Nov. 3, 2020. The prior application Ser. No. 17/088,540 claims the priority benefit of U.S. provisional application Ser. No. 62/938,955, filed on Nov. 22, 2019 and China application serial no. 202010909770.3, filed on Sep. 2, 2020. The entirety of each of the above-mentioned patent applications is hereby incorporated by reference herein and made a part of this specification.

BACKGROUND

Technical Field

The disclosure relates to an electronic device.

Description of Related Art

As the applications of electronic devices continue to diversify, the development of display technology is also constantly updated. Under different application conditions, the requirements for the appearance and display quality of electronic devices are increasing, and the electronic devices are faced with different challenges. Therefore, the research and development of electronic devices need to be continuously updated and adjusted.

SUMMARY

The disclosure provides an electronic device having a high screen-to-body ratio and exhibiting excellent display quality or excellent quality of forming images.

According to an embodiment of the disclosure, an electronic device includes a photosensor and a display panel. The display panel is disposed on the photosensor and includes a first display region and a second display region. The first display region overlaps the photosensor in a top view. The second display region is disposed adjacent to the first display region. The first display region has first display sub-pixels. The second display region has second display sub-pixels. Each of the first display sub-pixels includes only one color LED, and each of second display sub-pixels includes only one color LED. A size of one of the first display sub-pixels is greater than a size of one of the second display sub-pixels, and a gap between two adjacent ones of the first display sub-pixels is greater than a gap between two adjacent ones of the second display sub-pixels in a first direction.

Based on the above, in the electronic device of the embodiment of the disclosure, the first display region has the first display sub-pixels for display and the shutter pixels having good light transmittance. Therefore, the first display region has a display function, and the electronic device has a high screen-to-body ratio. In addition, the photosensor disposed under the display panel can receive image light of good quality and exhibit excellent quality of forming images. Also, the electronic device of the disclosure can adjust the arrangement or the area ratio of the first display sub-pixels and the shutter pixels in the first display region. Therefore, the electronic device can achieve a balance between display quality and the quality of forming images, and the electronic device has a high screen-to-body ratio and exhibits excellent display quality or excellent quality of forming images.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 1A is a schematic top view of an electronic device according to an embodiment of the disclosure.

FIG. 1B is a schematic partially enlarged top view of a region R of the electronic device of FIG. 1A.

FIG. 1C is a schematic partially enlarged top view of a region R of an electronic device according to another embodiment of the disclosure.

DESCRIPTION OF THE EMBODIMENTS

Figure 2B:
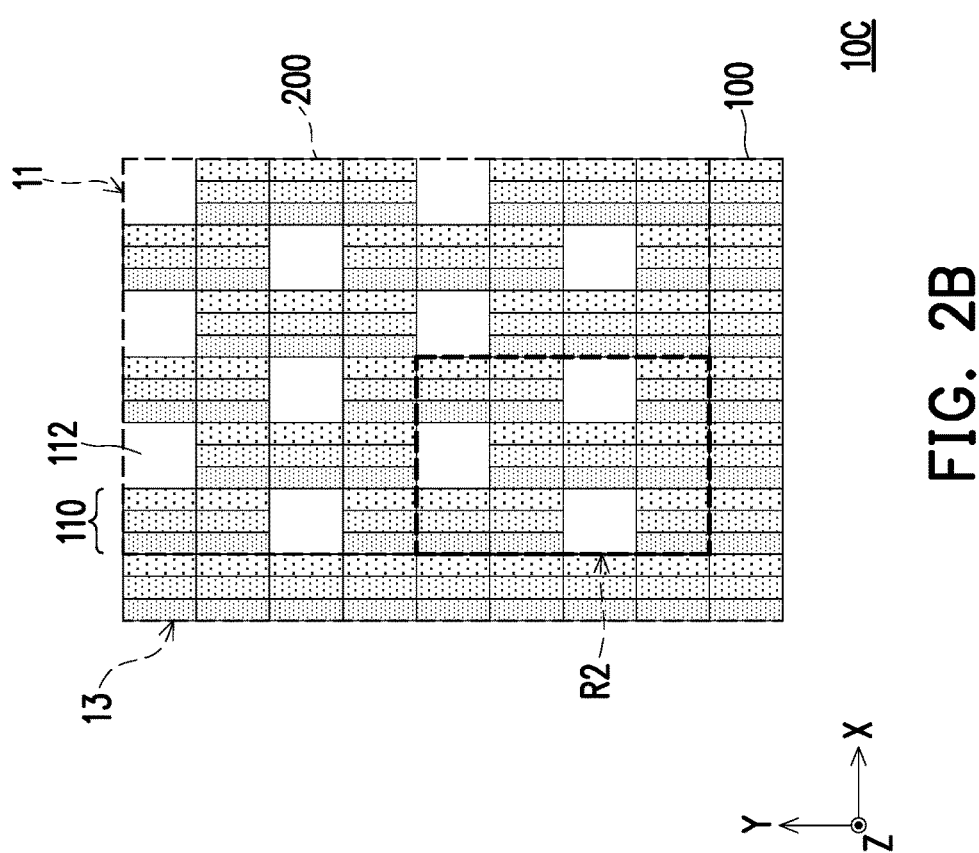
FIG. 2B is a schematic partially enlarged top view of an electronic device according to an embodiment of the disclosure.

The disclosure may be understood by referring to the following detailed description with reference to the accompanying drawings. It is noted that for comprehension of the reader and simplicity of the drawings, in the drawings of the disclosure, only a part of the electronic device is shown, and specific components in the drawings are not necessarily drawn to scale. Moreover, the quantity and the size of each component in the drawings are only schematic and are not intended to limit the scope of the disclosure.

Throughout the specification and the appended claims of the disclosure, certain terms are used to refer to specific components. Those skilled in the art should understand that electronic device manufacturers may probably use different names to refer to the same components. This specification is not intended to distinguish between components that have the same function but different names. In the following specification and claims, the terms "including", "containing", "having", etc., are open-ended terms, so they should be interpreted to mean "including but not limited to . . . ". Therefore, when the terms "including", "containing", and/or "having" are used in the description of the disclosure, they specify existence of corresponding features, regions, steps, operations, and/or components, but do not exclude existence of one or more corresponding features, regions, steps, operations, and/or components.

Directional terminology mentioned herein, such as "top", "bottom", "front", "back", "left", "right", etc., is used with reference to the orientation of the drawings. Therefore, the used directional terminology is only intended to illustrate, rather than limit, the disclosure. The drawings illustrate general characteristics of methods, structures, and/or materials used in specific embodiments. However, these drawings should not be construed as defining or limiting the scope or nature covered by these embodiments. For example, for clarity, relative sizes, thicknesses, and locations of film layers, regions, and/or structures may be reduced or enlarged.

In the disclosure, the length and width may be measured by an optical microscope, and the thickness may be measured based on a cross-sectional image in an electron microscope, but the disclosure is not limited thereto. In addition, there may be a certain error between any two values or directions used for comparison.

The terms such as "about", "equal", "same", "identical", "substantially", or "approximately" are generally interpreted as one value being within a range of plus or minus 20% of a given value, or as being within a range of plus or minus 10%, plus or minus 5%, plus or minus 3%, plus or minus 2%, plus or minus 1%, or plus or minus 0.5% of the given value.

In the disclosure, when a structure (or layer, component, substrate etc.) is described as being located on/above another structure (or layer, component, substrate, etc.), it may mean that the two structures are adjacent and directly connected, or it may mean that the two structures are adjacent but are not directly connected. "Not being directly connected" means that at least one intermediate structure (or intermediate layer, intermediate component, intermediate substrate, intermediate gap, etc.) is present between the two structures, where the lower surface of one structure is adjacent or directly connected to the upper surface of the intermediate structure, the upper surface of the other structure is adjacent or directly connected to the lower surface of the intermediate structure, and the intermediate structure may be composed of a single-layer or multi-layer physical structure or non-physical structure and is not specifically limited herein. In the disclosure, when one structure is disposed "on" another structure, it may mean that the one structure is "directly" on the another structure, or it may mean that the one structure is "indirectly" on the another structure (i.e., at least one other structure is interposed between the one structure and the another structure).

The terms such as "first", "second", etc. used in the specification of the disclosure may be used to describe devices, components, regions, layers, and/or parts, but the devices, components, regions, layers, and/or parts should not be limited by these terms. The terms are only intended to distinguish between a device, component, region, layer, or part from another device, component, region, layer, or part. Therefore, a first "device", "component", "region", "layer", or "part" discussed below is used to distinguish from a second "device", "component", "region", "layer", or "part" and is not intended to limit a sequence or a specific device, component, region, layer, and/or part. In addition, it is possible that in the claims it does not use the same terms and may replace the terms with "first", "second", "third" etc. according to the sequence declared in the claims. Accordingly, in the specification, a first component may be a second component in the claims.

In the disclosure, the electronic device may include a display device, an antenna device, a sensing device, a tiled device, or a transparent display device but is not limited thereto. The electronic device may include a rollable, stretchable, bendable, or flexible electronic device. The electronic device may include, for example, liquid crystal materials, light-emitting diodes (LED), quantum dot (QD) materials, fluorescence materials, phosphor materials, or other suitable materials, and the above materials may be arbitrarily arranged and combined. The light-emitting diodes may include, for example, organic light-emitting diode (OLED), mini LED, micro LED or quantum dot LED (e.g., QLED or QDLED), but is not limited thereto. The antenna device may include, for example, a liquid crystal antenna but is not limited thereto. The tiled device may be, for example, a tiled display device or a tiled antenna device but is not limited thereto. It is noted that the electronic device may be any combination of the above but is not limited thereto. In addition, the shape of the electronic device may be rectangular, circular, polygonal, a shape with curved edges, or other suitable shapes. The electronic device may have peripheral systems such as a driving system, a control system, a light source system, a rack system, etc. to support a display device, an antenna device, or a tiled device.

Hereinafter, a display device will be described to illustrate the content of the disclosure, but the disclosure is not limited thereto.

In the disclosure, various embodiments described below may be mixed and combined without departing from the spirit and scope of the disclosure. For example, some features of one embodiment may be combined with some features of another embodiment to form still another embodiment.

Reference will now be made in detail to the exemplary embodiments of the disclosure, examples of which are illustrated in the accompanying drawings. Whenever possible, the same reference numerals are used to represent the same or similar parts in the accompanying drawings and description.

FIG. 1A is a schematic top view of an electronic device according to an embodiment of the disclosure. FIG. 1B is a schematic partially enlarged top view of a region R of the electronic device of FIG. 1A. For clarity of the drawings and convenience of description, some components are not shown in FIG. 1A and FIG. 1B. Referring to FIG. 1A and FIG. 1B, an electronic device 10 includes a photosensor 200 and a display panel 100. The display panel 100 is disposed on the photosensor 200. Therefore, in the top view (e.g., in the Z-axis direction), the photosensor 200 overlaps with and is disposed under the display panel 100. In this embodiment, the display panel 100 includes a first display region 11 and a second display region 13. In the top view, the first display region 11 is located corresponding to the photosensor 200. In other words, the photosensor 200 overlaps with the first display region 11. In addition, in the top view, the second display region 13 is disposed adjacent to the first display region 11. In other words, the second display region 13 may be defined as a region other than the first display region 11 in the display panel 100, and the second display region 13 may surround or be adjacent to the first display region 11. In this embodiment, the display panel 100 is, for example, a liquid crystal display panel but is not limited thereto. The photosensor 200 may be, for example, an optical camera, an infrared sensor, a visible light sensor, or a combination of the above, and the embodiment is not limited thereto. With the above configuration, the electronic device 10 of the disclosure may be a display device with the camera-under-display technique, but the disclosure is not limited thereto. Since the electronic device 10 of this embodiment includes the photosensor 200 disposed under the display panel 100, the electronic device 10 can have a high screen-to-body ratio and exhibit excellent display quality or excellent quality of forming images. The arrangement of pixels will first be briefly described below.

Referring to FIG. 1B, the first display region 11 and part of the second display region 13 are shown in the region R. In the X-axis direction and Y-axis direction, the second display region 13 is disposed adjacent to the first display region 11. In the disclosure, the X axis is perpendicular to the Y axis, and the Z axis is perpendicular to the X axis or the Y axis.

The first display region 11 has a plurality of first display sub-pixels (e.g., first display sub-pixels 110R, first display sub-pixels 110G, and first display sub-pixels 110B) and a plurality of shutter pixels 112. In this embodiment, the X axis is substantially parallel to the extension direction of the short side of a first display sub-pixel, and the Y axis is substantially parallel to the extension direction of the long side of a first display sub-pixel, but the disclosure is not limited thereto. The first display sub-pixels are, for example, sub-pixels used to display an image, and include a first display sub-pixel 110R which displays the red color, a first display sub-pixel 110G which displays the green color, and the first display sub-pixel 110B which displays the blue color, but is not limited thereto. In this embodiment, in the first display region 11, at least three of a plurality of first display sub-pixels form a first display pixel 110. For example, the first display sub-pixel 110R, the first display sub-pixel 110G, and the first display sub-pixel 110B may collectively form a first display pixel 110, but the disclosure is not limited thereto. It is noted that the first display region in FIG. 1B only includes eight first display pixels 110 and eight shutter pixels 112, but the number of the first display pixels 110 and the number of the shutter pixels 112 are not limited thereto.

At least one of the plurality of shutter pixels 112 is disposed adjacent to at least one first display pixel 110. As shown in FIG. 1B, the shutter pixel 112 may be disposed adjacent to the first display pixel 110 in the X axis direction or the Y axis direction. In other words, the shutter pixels 112 and the first display pixels 110 may be alternately disposed in the X axis direction or the Y axis direction, but are not limited thereto. In this embodiment, the shutter pixel 112 is defined as, for example, a pixel which does not have any color and has good light transmittance, e.g., a transparent pixel of which the light transmittance is greater than or equal to 80%, or a transparent pixel of which the light transmittance is greater than that of any of the first display sub-pixels 110R, 110G, and 110B, and the shutter pixel 112 may drive liquid crystal molecules (not shown) to provide light transmission or light absorption effect. Accordingly, light from the outside can pass through the shutter pixel 112 and reach the photosensor 200 to generate an image signal or other signals.

In this embodiment, in the top view, the area of any one of the plurality of shutter pixels 112 may be greater than the area of any one of the plurality of first display sub-pixels. In other words, the area of the shutter pixel 112 may be greater than, for example, the area of the first display sub-pixel 110R (or the first display sub-pixel 110G or the first display sub-pixel 110B), but the embodiment is not limited thereto. In addition, in some embodiments, the area of the shutter pixel 112 may be equal to the area of the first display pixel 110 but is not limited thereto. In other embodiments, the area of the shutter pixel 112 may be greater or less than the area of the first display pixel 110. With the above configuration, for a user, a balance may be achieved between display quality and quality of forming images to obtain excellent display quality and/or good quality of forming images.

In this embodiment, the second display region 13 has a plurality of second display sub-pixels (including second display sub-pixels 130R, second display sub-pixels 130G, and second display sub-pixels 130B). The second display sub-pixels are, for example, sub-pixels used to display an image and include at least a second display sub-pixel 130R which displays the red color, a second display sub-pixel 130G which displays the green color, and a second display sub-pixel 130B which displays the blue color, but is not limited thereto. In this embodiment, in the second display region 13, at least three of a plurality of second display sub-pixels form a second display pixel 130. For example, the second display sub-pixel 130R, the second display sub-pixel 130G, and the second display sub-pixel 130B may collectively form a second display pixel 130, but the disclosure is not limited thereto.

In this embodiment, the plurality of second display pixels 130 may be arranged side by side in the X axis direction or arranged side by side in the Y axis direction, but are not limited thereto. In addition, in the top view, the area of any one of the second display sub-pixels 130R, 130G, and 130B may be greater than, equal to, or less than the area of any one of the first display sub-pixels 110R, 110G, and 110B.

It is noted that the photosensor 200 of the electronic device 10 of an embodiment of the disclosure may be disposed corresponding to the first display region 11 of the display panel 100, and the first display region 11 has a plurality of first display sub-pixels 110R, 110G, and 110B used for displaying images and shutter pixels 112 having excellent light transmittance. Therefore, the first display region 11 has a display function. In addition, the photosensor 200 disposed under the display panel 100 can receive image light of good quality and exhibits excellent quality of forming images. Based on the above, the electronic device 10 can achieve a balance between display quality and quality of forming images, and the electronic device has a high screen-to-body ratio and exhibits excellent display quality or excellent quality of forming images.

Other embodiments will be provided below for description. It is noted herein that the reference numerals and part of the descriptions of the above embodiment apply to the following embodiments, where the same numerals are used to represent the same or similar elements, and descriptions of the same technical contents are omitted. Reference may be made to the above embodiment for the descriptions of the omitted contents, which will not be repeated in the following embodiments.

FIG. 1C is a schematic partially enlarged top view of a region R of an electronic device according to another embodiment of the disclosure. For clarity of the drawings and convenience of description, some components are not shown in FIG. 1C. An electronic device 10A of this embodiment is substantially similar to the electronic device 10 of FIG. 1B, so the same and similar components in the two embodiments will not be repeatedly described herein. This embodiment differs from the electronic device 10 mainly in that, in the first display region 11, first display sub-pixels 110R', 110G', and 110B' and shutter pixels 112' are alternately disposed in the X-axis direction. For example, in the X-axis direction, the first display sub-pixel 110R', the shutter pixel 112', the first display sub-pixel 110G', the shutter pixel 112', the first display sub-pixel 110B', and the shutter pixel 112' are disposed. In other words, any one of the shutter pixels 112' is disposed between any two adjacent ones of the first display sub-pixels 110R', 110G', and 110B'. The first display sub-pixels 110R', 110G', and 110B' form a first display pixel 110'. In other words, there will be shutter pixels 112' interposed in the first display pixel 110'. In this embodiment, the first display sub-pixel 110R' and another first display sub-pixel 110R' are arranged side by side in the Y axis direction, and the shutter pixel 112' and another shutter pixel 112' are arranged side by side in the Y axis direction. However, in the disclosure, the arrangement of the first display sub-pixels 110R', 110G', and 110B' is not limited thereto.

In addition, in the top view, the area of any one of the shutter pixels 112' is less than the area of any one of the first display sub-pixels 110R', 110G', and 110B'. For example, the length of the shutter pixel 112' in the Y axis direction and the length of the first display sub-pixel 110R' in the Y axis direction may be substantially the same, but a width W1 of the first display sub-pixel 110R' in the X axis direction may be greater than a width W2 of the shutter pixel 112' in the X axis direction. In this embodiment, the length may be defined as the maximum length measured in the Y axis direction, and the width may be defined as the maximum width measured in the X axis direction. It is noted that the area ratio between the first display sub-pixels 110R', 110G', and 110B' and the shutter pixels 112' in the disclosure is not limited thereto. In other embodiments, the area of any one of the shutter pixels 112' may also be greater than or equal to the area of any one of the first display sub-pixels 110R', 110G', and 110B'. For example, the length of the shutter pixel 112' in the Y axis direction and the length of the first display sub-pixel 110R' in the Y axis direction may be substantially the same, but the width W2 of the shutter pixel 112' in the X axis direction may be greater than or equal to the width W1 of the first display sub-pixel 110R' in the X axis direction.

In this embodiment, the length of any one of the first display sub-pixels 110R', 110G', and 110B' in the Y axis direction may also be greater than the length of any one of the second display sub-pixels 130R', 130G', and 130B' in the Y axis direction. For example, the length of the first display sub-pixel 110R' in the Y axis direction may be approximately twice the length of the second display sub-pixel 130R' in the Y axis direction, but the embodiment is not limited thereto. In other embodiments, the length of the first display sub-pixel 110R' in the Y axis direction may also be three times or more the length of the second display sub-pixel 130R' in the Y axis direction. In addition, the width of any one of the first display sub-pixels 110R', 110G', and 110B' in the X axis direction may also be greater than the width of any one of the second display sub-pixels 130R', 130G', and 130B' in the X axis direction but is not limited thereto. With the above configuration, the user may adjust the arrangement or area ratio of the first display sub-pixels 110R', 110G', and 110B' and the shutter pixels 112' in the first display region 11 to obtain excellent display quality or excellent quality of forming images. In addition, the user may configure the first display sub-pixels 110R', 110G', and 110B' and the second display sub-pixels 130R', 130G', and 130B' to match each other, and the electronic device 10A can exhibit excellent display quality or excellent quality of forming images.

Figure 2A:
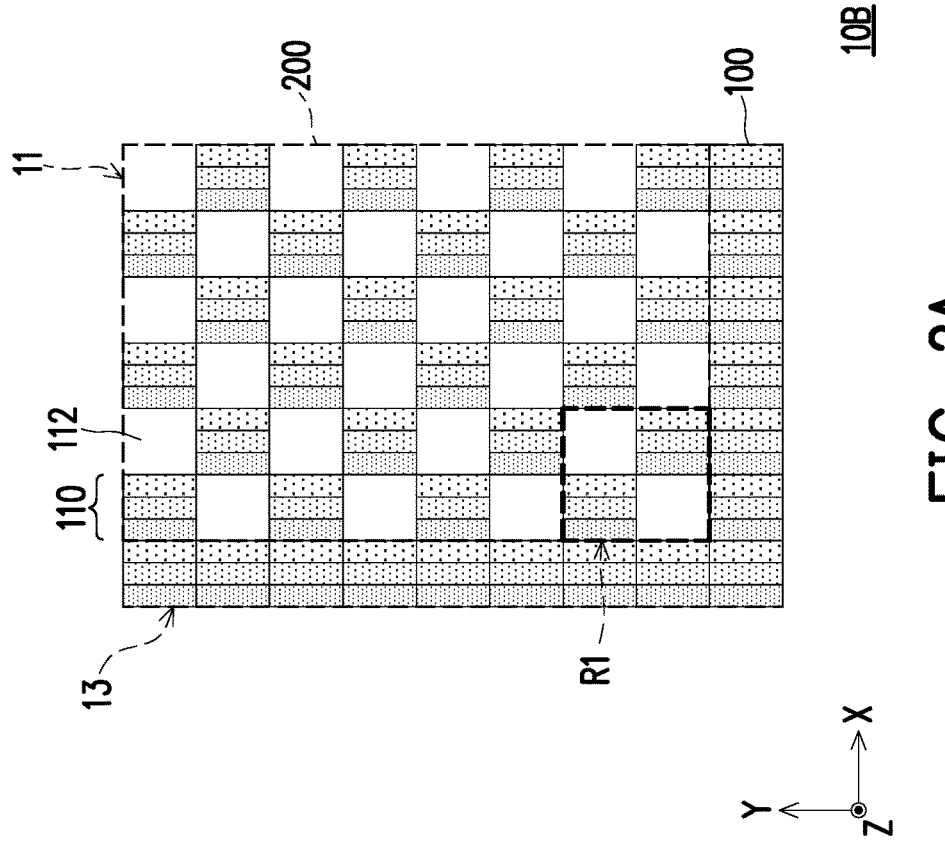
FIG. 2A is a schematic partially enlarged top view of an electronic device according to an embodiment of the disclosure.

FIG. 2A is a schematic partially enlarged top view of an electronic device according to an embodiment of the disclosure. For clarity of the drawings and convenience of description, some components are not shown in FIG. 2A. An electronic device 10B of this embodiment is similar to the electronic device 10 of FIG. 1B. For example, as shown in FIG. 2A, the shutter pixels 112 and the first display pixels 110 may be alternately disposed in the X axis direction and in the Y axis direction. In addition, in the first display region 11, the ratio of the number of the shutter pixels 112 to the number of the first display pixels 110 is 1:1, but the disclosure is not limited thereto. In some embodiments, in the first display region 11, the ratio of the total area of the shutter pixels 112 to the total area of the first display pixels 110 is 1:1. For example, the first display region 11 in FIG. 2A may have a region R1. The region R1 may be defined as a 2×2 matrix region formed by two pixels (the first display pixel 110 or the shutter pixel 112) respectively in the X axis direction and the Y axis direction. As shown in FIG. 2A, the region R1 includes two first display pixels 110 and two shutter pixels 112. In other words, the first display pixels 110 and the shutter pixels 112 are disposed at a ratio of 1:1. Namely, in the first display region 11, the number of the shutter pixels 112 accounts for one half (½) of all pixels. Accordingly, the electronic device 10B can achieve a balance between display quality and quality of forming images and exhibit excellent display quality or excellent quality of forming images.

In some embodiments, in the first display region 11, the ratio of the number of the shutter pixels 112 to the number or total area of the first display pixels 110 may also be in the range of 1:4 to 4:1 (¼≤number (total area) of shutter pixels/number (total area) of first display pixels<4). For example, the ratio of the number of the shutter pixels 112 to the number of the first display pixels, or the ratio of the total area of the shutter pixels 112 to the total area of the first display pixels 110 may be 1:1, 1:2, 1:3, 1:4, 2:1, 2:3, 3:1, 3:2, 3:4, 4:1, or 4:3, but is not limited thereto. In some embodiments, the ratio of the number or total area of the shutter pixels 112 to the first display pixels 110 may also be in the range of 1:25 to 25:1 (1/25≤number (total area) of shutter pixels/number (total area) of first display pixels ≤25). Hereinafter, other embodiments will be provided to briefly describe the pattern and the number ratio of the shutter pixels 112 and the first display pixels 110.

FIG. 2B is a schematic partially enlarged top view of an electronic device according to an embodiment of the disclosure. For clarity of the drawings and convenience of description, some components are not shown in FIG. 2B. An electronic device 10C of this embodiment is substantially similar to the electronic device 10B of FIG. 2A, so the same and similar components in the two embodiments will not be repeatedly described herein. This embodiment differs from the electronic device 10B mainly in that, in the first display region 11, the ratio of the number of the shutter pixels 112 to the number of the first display pixels 110 is 1:3. For example, the first display region 11 may have a region R2. The region R2 may be defined as a 3×4 matrix region formed by three pixels (the first display pixel 110 or the shutter pixel 112) in the X axis direction and four pixels (the first display pixel 110 or the shutter pixel 112) in the Y axis direction. As shown in FIG. 2B, the region R2 includes nine first display pixels 110 and three shutter pixels 112. In other words, the first display pixels 110 and the shutter pixels 112 are disposed at a ratio of 3:1. Namely, in the first display region 11, the number of the shutter pixels 112 accounts for one fourth (¼) of all pixels. Accordingly, the electronic device 10C can achieve a balance between display quality and quality of forming images and exhibit excellent display quality or excellent quality of forming images.

Figure 2D:
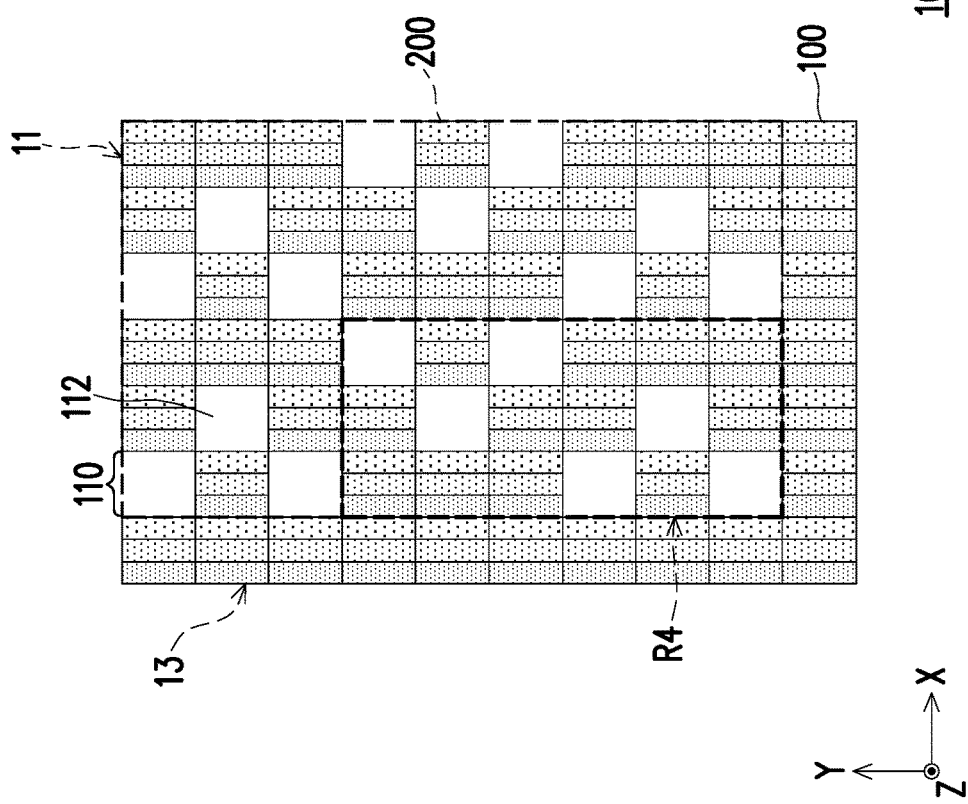
FIG. 2D is a schematic partially enlarged top view of an electronic device according to an embodiment of the disclosure.
Figure 2C:
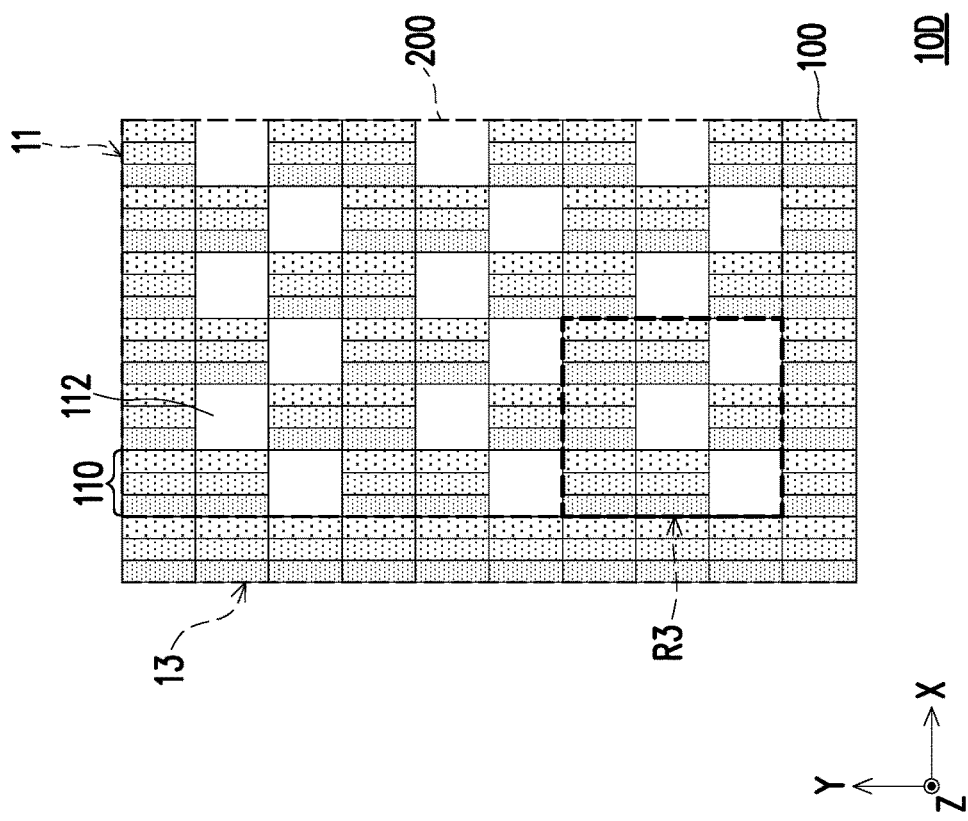
FIG. 2C is a schematic partially enlarged top view of an electronic device according to an embodiment of the disclosure.

FIG. 2C is a schematic partially enlarged top view of an electronic device according to an embodiment of the disclosure. For clarity of the drawings and convenience of description, some components are not shown in FIG. 2C. An electronic device 10D of this embodiment is substantially similar to the electronic device 10B of FIG. 2A, so the same and similar components in the two embodiments will not be repeatedly described herein. This embodiment differs from the electronic device 10B mainly in that, in the first display region 11, the ratio of the number of the shutter pixels 112 to the number of the first display pixels 110 is 1:2. For example, the first display region 11 may have a region R3. The region R3 may be defined as a 3×3 matrix region formed by three pixels (the first display pixel 110 or the shutter pixel 112) respectively in the X axis direction and the Y axis direction. As shown in FIG. 2C, the region R3 includes six first display pixels 110 and three shutter pixels 112. In other words, the first display pixels 110 and the shutter pixels 112 are disposed at a ratio of 2:1. Namely, in the first display region 11, the shutter pixels 112 account for one third (⅓) of all pixels. Accordingly, the electronic device 10D can achieve a balance between display quality and quality of forming images and exhibit excellent display quality or excellent quality of forming images.

FIG. 2D is a schematic partially enlarged top view of an electronic device according to an embodiment of the disclosure. For clarity of the drawings and convenience of description, some components are not shown in FIG. 2D. An electronic device 10E of this embodiment is substantially similar to the electronic device 10B of FIG. 2A, so the same and similar components in the two embodiments will not be repeatedly described herein. This embodiment differs from the electronic device 10B mainly in that, in the first display region 11, the ratio of the number of the shutter pixels 112 to the number of the first display pixels 110 is 1:2. For example, the first display region 11 may have a region R4. The region R4 may be defined as a 3×6 matrix region formed by three pixels (the first display pixel 110 or the shutter pixel 112) in the X axis direction and six pixels (the first display pixel 110 or the shutter pixel 112) in the Y axis direction. As shown in FIG. 2D, the region R4 includes twelve first display pixels 110 and six shutter pixels 112. In other words, the first display pixels 110 and the shutter pixels 112 are disposed at a ratio of 2:1. Namely, in the first display region 11, the shutter pixels 112 account for one third (⅓) of all pixels. Accordingly, the electronic device 10E can achieve a balance between display quality and quality of forming images and exhibit excellent display quality or excellent quality of forming images.

It is noted herein that the electronic devices 10B, 10C, 10D, and 10E shown in FIG. 2A to FIG. 2D are different in the pixel arrangement and/or the pixel ratio, and the disclosure does not specifically limit the pixel arrangement. In some embodiments, the first display pixels 110 and the shutter pixels 112 are alternately arranged. In other words, the shutter pixel 112 is adjacent to at least one first display pixel 110, but is not limited thereto. In some embodiments, the shutter pixel 112 may also be adjacent to another shutter pixel 112. Without departing from the spirit and scope of the disclosure, the arrangement of the first display pixels 110 and the shutter pixels 112 shown in FIG. 2A to FIG. 2D may be mixed and combined.

Figures 3A, 3B, 3C:
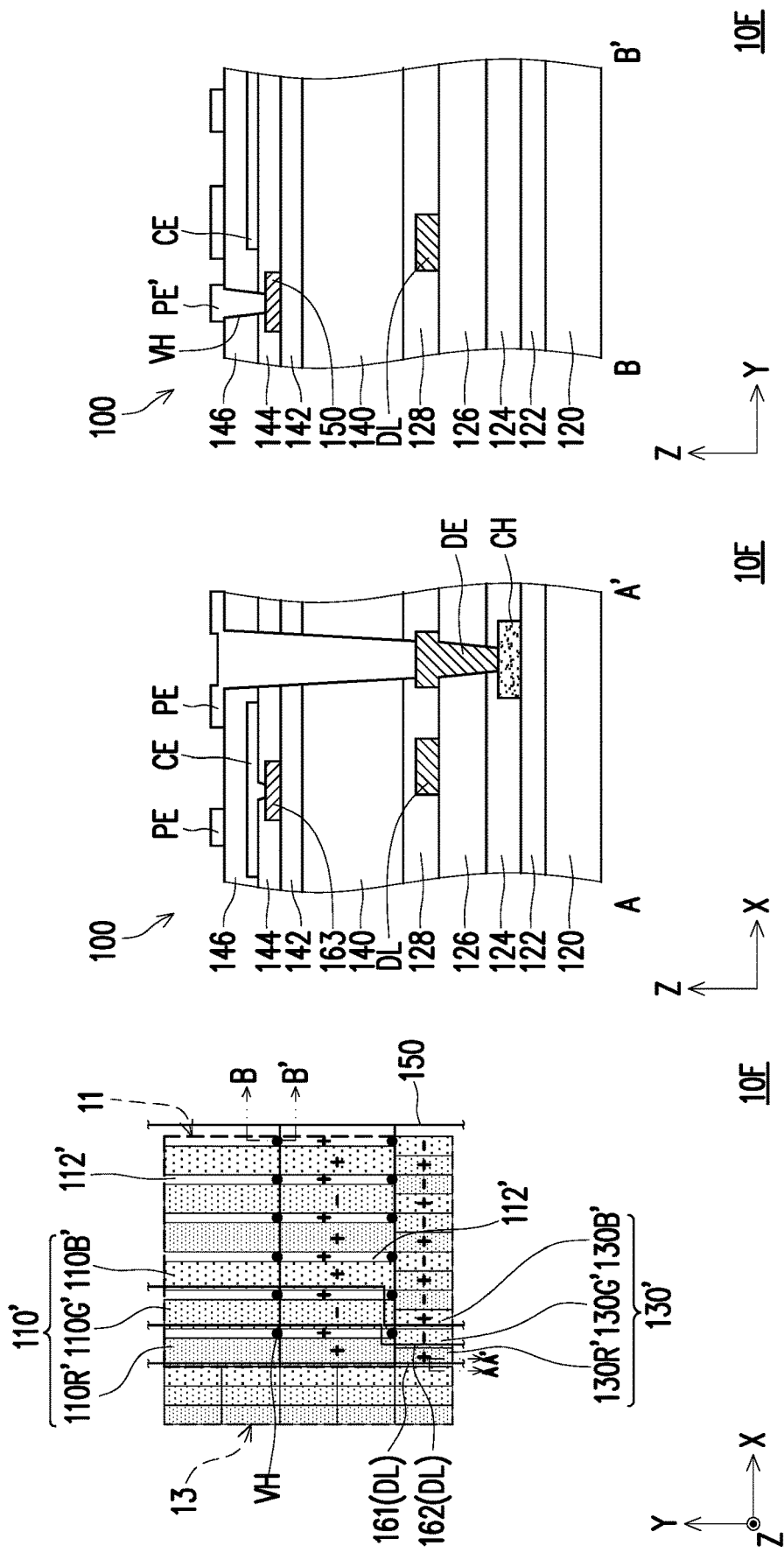
FIG. 3A is a schematic partially enlarged top view of an electronic device according to an embodiment of the disclosure.
FIG. 3B is a schematic cross-sectional view of the electronic device of FIG. 3A along cross-sectional line A-A'.
FIG. 3C is a schematic cross-sectional view of the electronic device of FIG. 3A along cross-sectional line B-B'.

FIG. 3A is a schematic partially enlarged top view of an electronic device according to an embodiment of the disclosure. For clarity of the drawings and convenience of description, some components are not shown in FIG. 3A. FIG. 3B is a schematic cross-sectional view of the electronic device of FIG. 3A along cross-sectional line A-A', and FIG. 3C is a schematic cross-sectional view of the electronic device of FIG. 3A along cross-sectional line B-B'. An electronic device 10F of this embodiment is substantially similar to the electronic device 10A of FIG. 1C, so the same and similar components in the two embodiments will not be repeatedly described herein. This embodiment differs from the electronic device 10A mainly in that the display panel 100 of the electronic device 10F further includes a first conductive wiring 150 and second conductive wirings 161 and 162. In this embodiment, the first conductive wiring 150 is electrically connected to the first display region 11 and is electrically connected to at least one of the plurality of shutter pixels 112'. The second conductive wirings 161 and 162 may be electrically connected to the second display region 13 and/or the first display region 11, and the second conductive wirings 161 and 162 are respectively electrically connected to at least one of the plurality of second display sub-pixels 130R', 130G', and 130B'. The pixel structure of the electronic device 10F will be briefly described below.

Referring to FIG. 3A, FIG. 3B, and FIG. 3C, the display panel 100 of the electronic device 10F includes a first substrate 120, and insulating layers 122, 124, 126, 128, 140, 142, 144, and 146 sequentially stacked on the first substrate 120 in the Z axis direction. In this embodiment, the first substrate 120 may include a rigid substrate, a flexible substrate, or a combination of the above. For example, the material of the first substrate 120 may include glass, quartz, sapphire, ceramic, polycarbonate (PC), polyimide (PI), polyethylene terephthalate (PET), other suitable substrate materials, or a combination of the above, but is not limited thereto. In this embodiment, an active device and a signal wiring may be respectively disposed between the multiple insulating layers. The insulating layers 122, 124, 126, 128, 140, 142, 144, and 146 may respectively have a single-layer or multi-layer structure, and may include, for example, an organic material (e.g., silicon nitride, etc.), an inorganic material, or a combination of the above, but are not limited thereto.

In this embodiment, the first display sub-pixels 110R', 110G', and 110B' and the first display pixels 110' formed thereby are disposed in the first display region 11. The shutter pixels 112' are disposed adjacent to the first display sub-pixels 110R', 110G', and 110B' in the first display region 11. The second display sub-pixels 130R', 130G', 130B' and the second display pixels 130' formed thereby are disposed in the second display region 13.

Referring to FIG. 3B and FIG. 3C, the insulating layer 122 is disposed on the first substrate 120. A semiconductor layer CH is disposed on the insulating layer 122. The insulating layer 124 is disposed on the semiconductor layer CH and the insulating layer 122 to serve as a gate insulating layer. The insulating layer 126 is disposed on the insulating layer 124. A data line DL and a drain electrode DE are disposed on the insulating layer 126. The drain electrode DE may be electrically connected to the semiconductor layer CH through the vias of the insulating layers 124 and 126. The insulating layer 128 is disposed on the data line DL, the drain electrode DE, and the insulating layer 126. The insulating layer 140 is disposed on the insulating layer 128. The insulating layer 142 is disposed on the insulating layer 140. A conductor layer 163 is disposed on the insulating layer 142. The insulating layer 144 is disposed on the conductor layer 163 and the insulating layer 142. A common electrode CE is disposed on the insulating layer 144. The common electrode CE is electrically connected to the conductor layer 163 through the via of the insulating layer 144. The insulating layer 146 is disposed on the insulating layer 144. Pixel electrodes PE and PE' are disposed on the insulating layer 146. In FIG. 3B, the pixel electrode PE may be electrically connected to the drain electrode DE through the vias of the insulating layers 128, 140, 142, 144, and 146. In FIG. 3C, the pixel electrode PE' may be electrically connected to the first conductive wiring 150 through the vias VH of the insulating layers 144 and 146. It is noted that the stacking relationship between the layers in this embodiment is only an example, but the disclosure is not limited thereto. In this embodiment, the active device is formed by, for example, the semiconductor layer CH, a gate electrode (not shown), a source electrode (not shown), and the drain electrode DE. The material of the semiconductor layer CH includes amorphous silicon, low-temperature polysilicon (LTPS), metal oxide (e.g., indium gallium zinc oxide (IGZO)), other suitable materials, or a combination of the above, but is not limited thereto. In some embodiments, different active devices may include different semiconductor layer materials. For example, the semiconductor layer of some active devices includes low-temperature polysilicon, and the material of the semiconductor layer CH of other active devices includes metal oxide. In this embodiment, the active device may have a top-gate structure, a bottom-gate structure, or other suitable structures, but is not limited thereto. The material of the source electrode and the drain electrode DE may include a transparent conductive material or a non-transparent conductive material, such as indium tin oxide, indium zinc oxide, indium oxide, zinc oxide, tin oxide, a metal material (e.g., aluminum, molybdenum, copper, argentum, etc.), other suitable materials, or a combination of the above, but is not limited thereto.

In this embodiment, the signal wiring includes a scan line (not shown), the data line DL, a power line, or other conductive wirings. In this embodiment, the scan line and the data line DL intersect each other, and the data line DL may transmit data signals to control the display sub-pixels. In other words, in this embodiment, the data line DL in FIG. 3B is equivalent to, but not limited to, the second conductive wirings 161 and 162 in FIG. 3A. The scan line may extend substantially in the X axis direction, and the data line DL may extend substantially in the Y axis direction, but are not limited thereto. The scan line may be electrically connected to the gate electrode of the active device, and the data line DL may be electrically connected to the source electrode, and the active device can be electrically connected to the scan line and the data line DL respectively through the gate electrode and the source electrode. In some embodiments, the material of the scan line and the data line DL may include molybdenum (Mo), titanium (Ti), tantalum (Ta), niobium (Nb), hafnium (Hf), nickel (Ni), chromium (Cr), cobalt (Co), zirconium (Zr), tungsten (W), aluminum (Al), copper (Cu), argentum (Ag), other suitable metals, or alloys or combinations of the above materials, but is not limited thereto.

Referring to FIG. 3A, FIG. 3B, and FIG. 3C, in this embodiment, the first conductive wiring 150 is electrically connected to the first display region 11, and the first conductive wiring 150 is electrically connected to at least one of the shutter pixels 112'. For example, the first conductive wiring 150 extends along the Y axis direction, and extends into the first display region 11 along the X axis direction. The first conductive wiring 150 extending in the X axis direction is electrically connected to the pixel electrode PE' (shown in FIG. 3C; to be described later) of the shutter pixel 112' through the via VH. The second conductive wirings 161 and 162 (equivalent to the data line DL in FIG. 3B) are electrically connected to the second display region 13, and the second conductive wirings 161 and 162 are electrically connected to at least one of the plurality of second display sub-pixels 130R', 130G', and 130B'. For example, the second conductive wiring 161 extends along the Y axis direction in the second display region 13 to be electrically connected to the second display sub-pixel 130R'. In addition, the second conductive wiring 161 may also extend along the Y axis direction into the first display region 11 to be electrically connected to the first display sub-pixel 110R', but this embodiment is not limited thereto. With the above configuration, the first display sub-pixel 110R' and the second display sub-pixel 130R' can be coupled through the corresponding second conductive wiring 161. Analogously, the first display sub-pixel 110G' and the second display sub-pixel 130G' can be coupled through the corresponding second conductive wiring 162, and the first display sub-pixel 110B' and the second display sub-pixel 130B' can also be coupled through the corresponding second conductive wiring. In some embodiments, it is also possible to dispose additional third conductive wirings electrically connected to the first display sub-pixels 110R', 110G', and 110B' to transmit display signals for controlling the first display sub-pixels 110R', 110G', and 110B'.

Referring to FIG. 3A, FIG. 3B, and FIG. 3C, in the second display region 13, the conductor layer 163 is electrically connected to the common electrode CE through the via of the insulating layer 144. In other words, the conductor layer 163 may be used as a common electrode line.

In the first display region 11, the first conductive wiring 150 is electrically connected to the pixel electrode PE' through the vias VH of the insulating layers 144 and 146. In other words, the electronic device 10F can control the shutter pixel 112' through the first conductive wiring 150. Namely, the transmittance of the shutter pixel 112' can be adjusted through the signal transmitted by the first conductive wiring 150, but is not limited thereto. In this embodiment, the first conductive wiring 150 and the conductor layer 163 may be formed in the same layer to reduce the manufacturing costs, but the disclosure is not limited thereto. The material of the first conductive wiring 150 and the conductor layer 163 may include aluminum, copper, silver, other suitable metals, or alloys or combinations of the above materials, but is not limited thereto.

With the above configuration, the first conductive wiring 150 can be used to control all or part of the shutter pixels 112' in the first display region 11, and the second conductive wirings 161 and 162 and the active device can be used to control the first display pixels 110' and the second display pixels 130'. In this embodiment, the first conductive wiring 150 may be coupled to an electronic component to transmit a signal for controlling the shutter pixel 112'. The electronic component includes, for example, a chip and a flexible printed circuit board (FPC), but is not limited thereto.

In addition, according to the transmitted signal, the first conductive wiring 150 and the second conductive wirings 161 and 162 respectively have a polarity. It is noted that the term "polarity" in the disclosure refers to the positive or negative value of the voltage value of the signal transmitted by the conductive wiring. When the signal voltage value is greater than zero, the polarity is positive, and when the signal voltage value is less than zero, the polarity is negative. The polarity of the first conductive wiring 150 and the polarity of the second conductive wiring 161 may be the same or different. The polarities of the second conductive wiring 161 and the second conductive wiring 162 may be the same or different. In some embodiments, the plurality of shutter pixels 112' electrically connected to the first conductive wiring 150 may have the same polarity. The second display sub-pixels 130R', 130G', and 130B' electrically connected to the second conductive wiring may respectively have the same polarity as the corresponding first display sub-pixels 110R', 110G', and 110B' (in other words, when a second conductive wiring is electrically connected to both the first display region and the second display region, the first display sub-pixel and the second display sub-pixel which are electrically connected by the second conductive wiring have the same polarity). For example, when the first conductive wiring 150 has a positive polarity, the plurality of shutter pixels 112' electrically connected to the first conductive wiring 150 also all have a positive polarity. When the second conductive wiring 161 has a positive polarity, the corresponding first display sub-pixel 110R' and second display sub-pixel 130R' have a positive polarity. When the second conductive wiring 162 has a negative polarity, the corresponding first display sub-pixel 110G' and second display sub-pixel 130G' have a negative polarity. In addition, considering the operation time of the photosensor (e.g., the shutter speed of the camera), in some embodiments, the signal for controlling the shutter pixel 112' is adjusted according to the control signal of the photosensor to improve the quality of forming images.

In other embodiments, the first conductive wiring 150 may also have a negative polarity, and the plurality of shutter pixels 112' electrically connected to the first conductive wiring 150 may also all have a negative polarity, but the disclosure is not limited thereto.

Figure 4B:
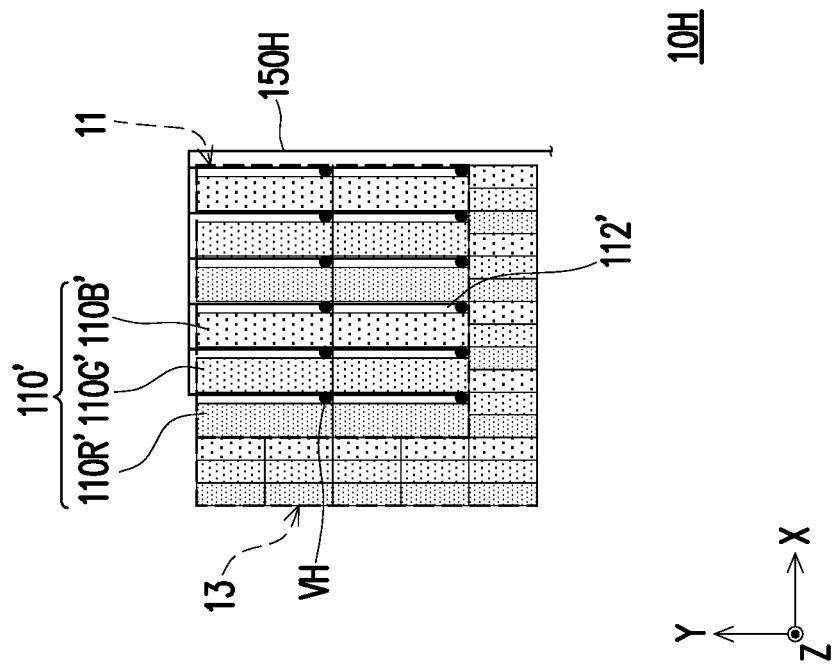
FIG. 4B is a schematic partially enlarged top view of an electronic device according to an embodiment of the disclosure.
Figure 4A:
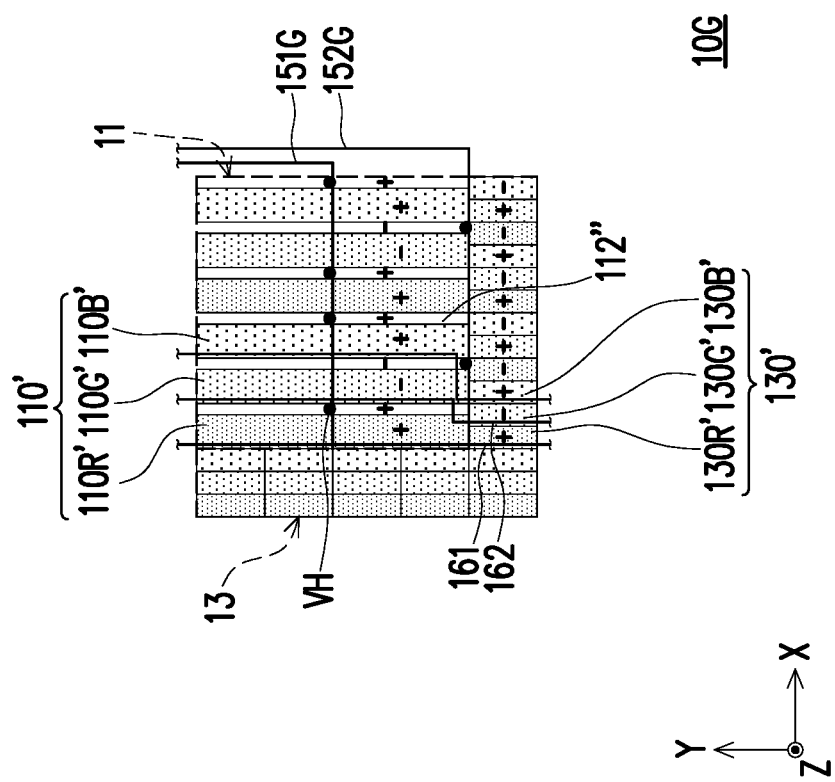
FIG. 4A is a schematic partially enlarged top view of an electronic device according to an embodiment of the disclosure.

FIG. 4A is a schematic partially enlarged top view of an electronic device according to an embodiment of the disclosure. For clarity of the drawings and convenience of description, some components are not shown in FIG. 4A. An electronic device 10G of this embodiment is substantially similar to the electronic device 10F of FIG. 3A, so the same and similar components in the two embodiments will not be repeatedly described herein. This embodiment differs from the electronic device 10F mainly in that the shutter pixels 112" may be respectively connected to different first conductive wirings 151G and 152G. The first conductive wirings 151G and 152G respectively extend along the Y axis direction, and then extend along the X axis direction into the first display region 11. In this embodiment, the first conductive wiring 151G is electrically connected to part of the shutter pixels 112". The first conductive wiring 152G is electrically connected to another part of the shutter pixels 112". In this embodiment, at least one first display sub-pixel 110G' (or first display sub-pixel 110B') may be interposed between two adjacent shutter pixels 112".

In this embodiment, the first conductive wiring 151G and the first conductive wiring 152G may respectively have different polarities. For example, the first conductive wiring 151G has a positive polarity, and the first conductive wiring 152G has a negative polarity. Therefore, the shutter pixels 112" correspondingly connected to the first conductive wiring 151G have a positive polarity, and the shutter pixels 112" correspondingly connected to the first conductive wiring 152G have a negative polarity. Accordingly, two adjacent shutter pixels 112" may respectively have different polarities. For example, in the first display region 11, the shutter pixel 112" on the right side of the first display sub-pixel 110R' may have a positive polarity, and the shutter pixel 112" on the right side of the first display sub-pixel 110G' may have a negative polarity, but the disclosure is not limited thereto. By adjusting the connection of the first conductive wirings 151G and 152G and the polarity of the control signal, the electronic device 10G can exhibit excellent display quality or excellent quality of forming images.

In some embodiments, the connection of the first conductive wirings 151G and 152G may be adjusted and two consecutive adjacent shutter pixels 112" have the same polarity. For example, in FIG. 4A, the shutter pixel 112" on the right side of the first display sub-pixel 110B' and an adjacent shutter pixel 112" on the right side of this shutter pixel 112" have the same polarity. However, in the disclosure, the number of adjacent shutter pixels of the same polarity is not limited thereto.

FIG. 4B is a schematic partially enlarged top view of an electronic device according to an embodiment of the disclosure. For clarity of the drawings and convenience of description, some components are not shown in FIG. 4B. An electronic device 10H of this embodiment is substantially similar to the electronic device 10F of FIG. 3A, so the same and similar components in the two embodiments will not be repeatedly described herein. This embodiment differs from the electronic device 10F mainly in that a first conductive wiring 150H first extends along the Y axis direction, then extends along the X axis direction, and then extends along the Y axis direction into the first display region 11. The first conductive wiring 150H corresponds to a plurality of shutter pixels 112' in the Y axis direction, and is electrically connected to the shutter pixels 112' through the via VH. In this embodiment, the first conductive wiring 150H may have a positive polarity, and the plurality of shutter pixels 112' electrically connected to the first conductive wiring 150H may also all have a positive polarity, but the disclosure is not limited thereto. In some embodiments, the first conductive wiring 150H may have a negative polarity, and the plurality of shutter pixels 112' electrically connected to the first conductive wiring 150H may also all have a negative polarity. It is noted that FIG. 3A, FIG. 4A, and FIG. 4B respectively disclose the connection of the first conductive wirings 150, 151G, 152G, and 150H and the shutter pixels 112' and 112", but the disclosure is not limited thereto.

Figure 5B:
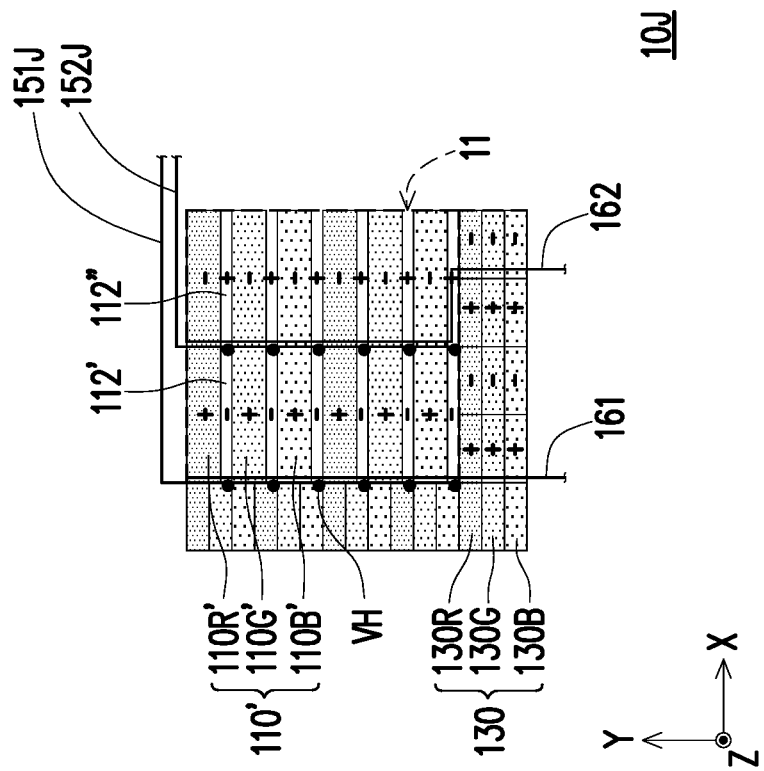
FIG. 5B is a schematic partially enlarged top view of an electronic device according to an embodiment of the disclosure.
Figure 5A:
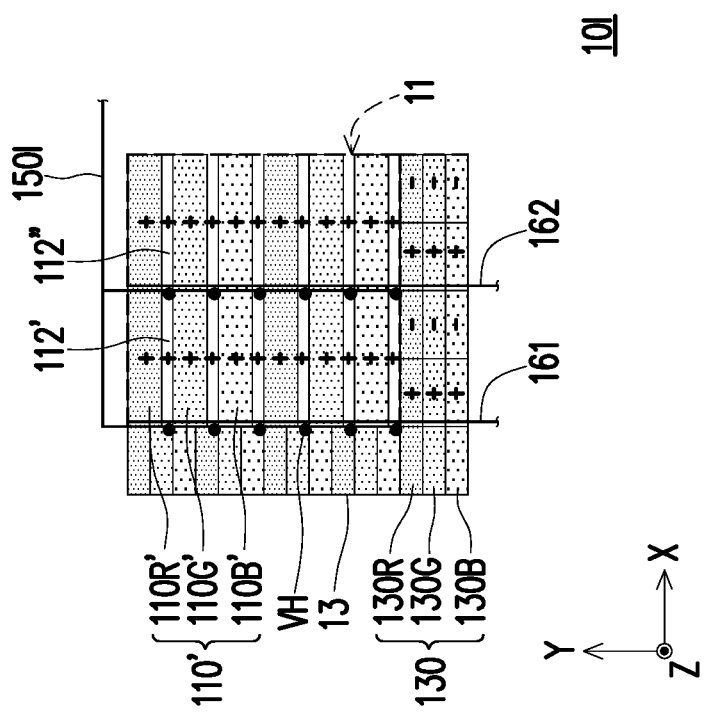
FIG. 5A is a schematic partially enlarged top view of an electronic device according to an embodiment of the disclosure.

FIG. 5A is a schematic partially enlarged top view of an electronic device according to an embodiment of the disclosure. For clarity of the drawings and convenience of description, some components are not shown in FIG. 5A. An electronic device 10I of this embodiment is substantially similar to the electronic device 10H of FIG. 4B, so the same and similar components in the two embodiments will not be repeatedly described herein. This embodiment differs from the electronic device 10H mainly in that the extending direction of the long side of the first display sub-pixels 110R', 110G', and 110B' and the second display sub-pixels 130R, 130G, and 130B is the X-axis direction. The extending direction of the length of the shutter pixels 112' and 112" is also the X axis direction. In addition, the area of the first display sub-pixels 110R', 110G', and 110B' may be greater than that of the second display sub-pixels 130R, 130G, and 130B. Specifically, the length of any one of the first display sub-pixels 110R', 110G', and 110B' in the X axis direction is greater than the length of any one of the second display sub-pixels 130R, 130G, and 130B in the X axis direction. Moreover, the width of any one of the first display sub-pixels 110R', 110G', and 110B' in the Y axis direction is greater than the width of any one of the second display sub-pixels 130R, 130G, and 130B in the Y axis direction. Furthermore, the width of any one of the first display sub-pixels 110R', 110G', and 110B' in the Y axis direction is also greater than the width of any one of the shutter pixels 112' and 112" in the Y axis direction. However, the disclosure is not limited thereto.

In this embodiment, the first conductive wiring 150I extends along the X axis direction, and then extends along the Y axis direction into the first display region 11. The first conductive wiring 150I corresponds to a plurality of shutter pixels 112' and 112" in the Y-axis direction, and is electrically connected to the shutter pixels 112' and 112" through the via VH. In this embodiment, the first conductive wiring 150I may have a positive polarity, and the plurality of shutter pixels 112' and 112" electrically connected to the first conductive wiring 150I may also all have a positive polarity, but the disclosure is not limited thereto. In some embodiments, the first conductive wiring 150I may have a negative polarity, and the plurality of shutter pixels 112' and 112" electrically connected to the first conductive wiring 150I may also all have a negative polarity.

In this embodiment, the second conductive wiring 161 is electrically connected to the second display sub-pixels 130R, 130G, and 130B, extends from outside the first display region 11 into the first display region 11, and is electrically connected to the first display sub-pixels 110R', 110G', and 110B'. Therefore, the first display sub-pixels 110R', 110G', and 110B', and the second display sub-pixels 130R, 130G, and 130B electrically connected to the second conductive wiring 161 also all have the same polarity, e.g., a positive polarity. In addition, the second conductive wiring 162 is also electrically connected to the second display region 13, extends into the first display region 11, and is electrically connected to the first display sub-pixels 110R', 110G', and 110B'. With the above configuration, when the first conductive wiring 150I, the second conductive wiring 161, and the second conductive wiring 162 all have a positive polarity, the first display region may have two columns of pixels in the Y axis direction, all of which have a positive polarity. Accordingly, the polarities of the pixels in the first display region 11 can be consistent. However, the disclosure is not limited thereto. In some embodiments, the polarities of the first conductive wiring 150I and the second conductive wirings 161 and 162 may be different.

FIG. 5B is a schematic partially enlarged top view of an electronic device according to an embodiment of the disclosure. For clarity of the drawings and convenience of description, some components are not shown in FIG. 5B. An electronic device 10J of this embodiment is substantially similar to the electronic device 10H of FIG. 4B, so the same and similar components in the two embodiments will not be repeatedly described herein. This embodiment differs from the electronic device 10H mainly in that the shutter pixels 112' and 112" may be respectively electrically connected to different first conductive wirings 151J and 152J. The first conductive wiring 151J electrically connects a plurality of shutter pixels 112' along the Y axis direction. Another first conductive wiring 152J electrically connects a plurality of shutter pixels 112" along the Y axis direction. Since the two first conductive wirings 151J and 152J and the two second conductive wirings 161 and 162 are not electrically connected to each other, in some embodiments, the polarities of the first conductive wiring 151J and the first conductive wiring 152J may be different. For example, the first conductive wiring 151J has a negative polarity, and the first conductive wiring 152J has a positive polarity. The polarities of the second conductive wiring 161 and the second conductive wiring 162 may also be different. For example, the second conductive wiring 161 corresponding to the first conductive wiring 151J having a negative polarity has a positive polarity, and the second conductive wiring 162 corresponding to the first conductive wiring 152J having a positive polarity has a negative polarity. Therefore, the negative-polarity shutter pixels 112' and the positive-polarity first display sub-pixels 110R', 110G', and 110B' are alternately disposed, and the positive-polarity shutter pixels 112" and the negative-polarity first display sub-pixels 110R', 110G', and 110B' are alternately disposed.

In some embodiments, the first conductive wiring 151J may also have a positive polarity, and the first conductive wiring 152J may have a negative polarity. In that case, the first conductive wiring 151J and the corresponding second conductive wiring 161 have a positive polarity, and the first conductive wiring 152J and the corresponding second conductive wiring 162 have a negative polarity. However, in the disclosure, the polarity relationship among the first conductive wirings 151J and 152J, the second conductive wirings 161 and 162, the shutter pixels 112' and 112", and the first display sub-pixels 110R', 110G', and 110B' is not limited thereto.

Figure 6C:
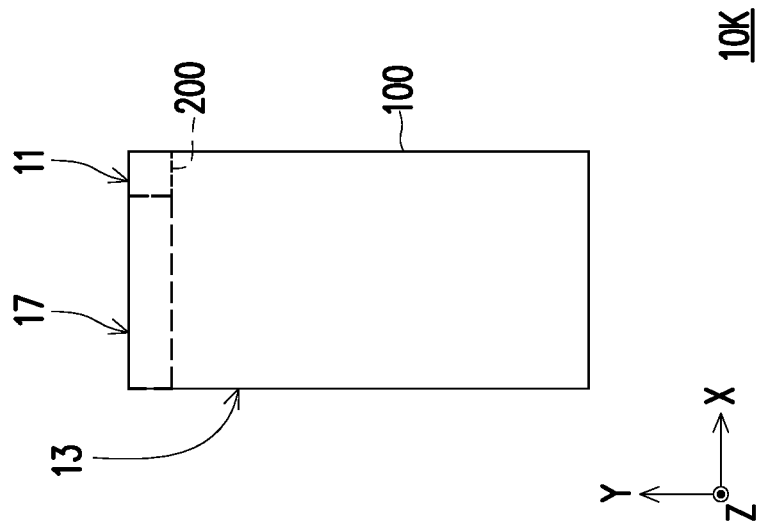
FIG. 6C is a schematic top view of an electronic device in the camera mode according to an embodiment of the disclosure.
Figure 6B:
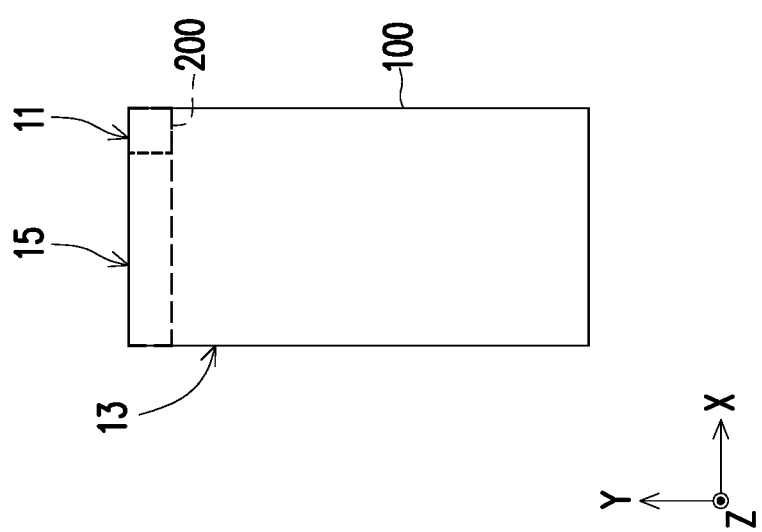
FIG. 6B is a schematic top view of an electronic device in the camera mode according to an embodiment of the disclosure.
Figure 6A:
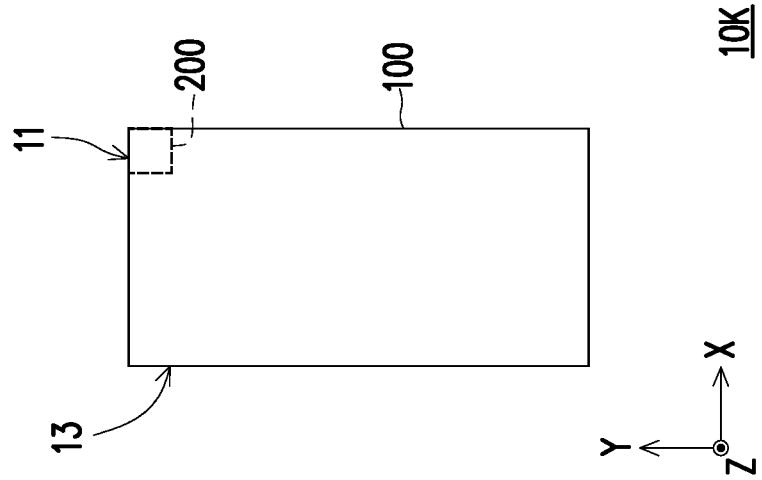
FIG. 6A is a schematic top view of an electronic device in a camera mode according to an embodiment of the disclosure.

FIG. 6A is a schematic top view of an electronic device in a camera mode according to an embodiment of the disclosure. FIG. 6B is a schematic top view of an electronic device in the camera mode according to an embodiment of the disclosure. FIG. 6C is a schematic top view of an electronic device in the camera mode according to an embodiment of the disclosure. For clarity of the drawings and convenience of description, some components are not shown in FIG. 6A, FIG. 6B, and FIG. 6C. Reference may be made to the above embodiments for descriptions of the same or similar components, which shall not be repeatedly described herein. In this embodiment, the camera mode is defined as follows: the shutter pixels 112' (for example, shown in FIG. 3A) in the first display region 11 are controlled by the first conductive wiring 150 (for example, shown in FIG. 3A), and light can pass through the shutter pixels 112' to reach the photosensor 200. Taking the photosensor 200 as a camera module as an example, in the camera mode, the shutter pixels 112' can allow the image light to pass through the shutter pixels 112', and the photosensor 200 can obtain image signals. In contrast to the camera mode, the display mode corresponds to the case where the light is absorbed or blocked by the shutter pixels 112' in the first display region 11 and cannot reach the photosensor 200. Accordingly, excellent display quality can be maintained in the display mode.

Figure 8B:
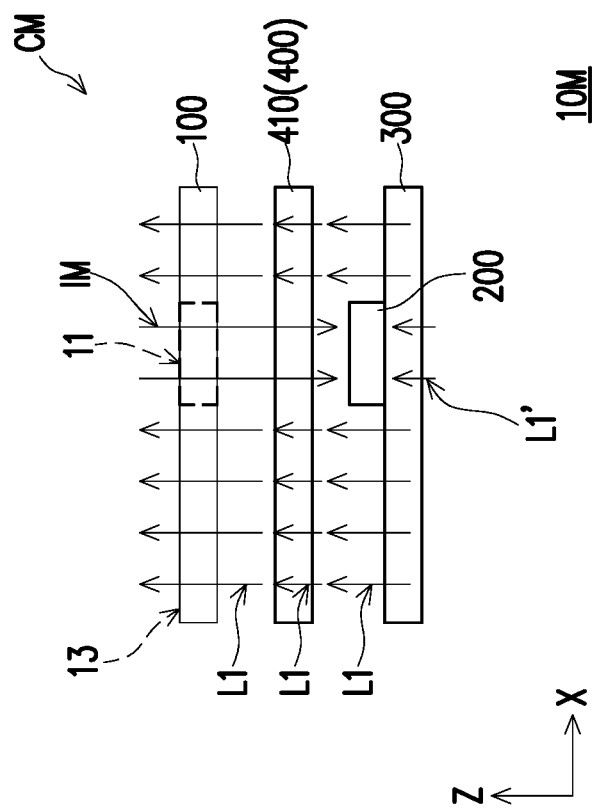
FIG. 8B is a schematic cross-sectional view of an electronic device in the camera mode according to an embodiment of the disclosure.
Figure 8A:
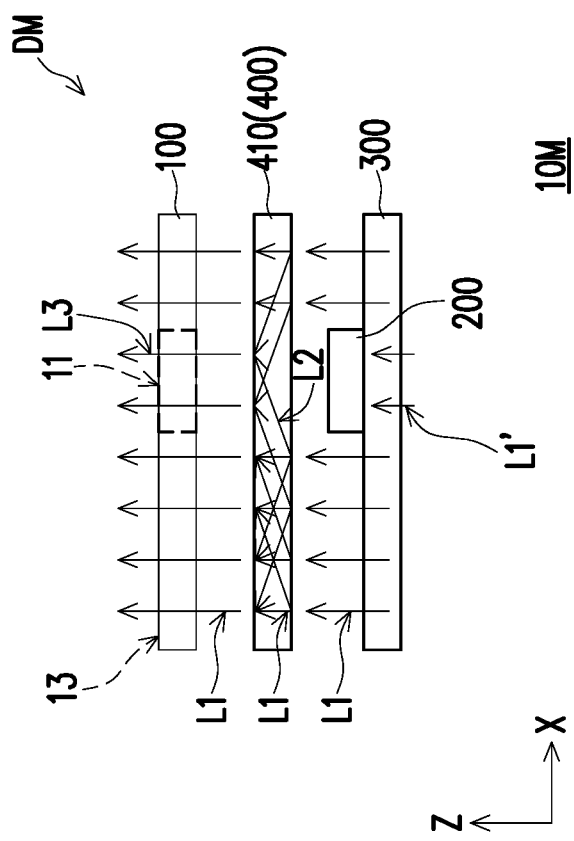
FIG. 8A is a schematic cross-sectional view of an electronic device in the display mode according to an embodiment of the disclosure.

The electronic device 10K of this embodiment may further include a backlight module (shown in FIG. 8A). The display panel 100 is disposed on and overlaps with the backlight module. In the camera mode, part of the backlight module may emit light and another part does not emit light. Taking FIG. 6A as an example, the backlight module may emit light in the part corresponding to the second display region 13 but does not emit light in the part corresponding to the first display region 11. With the above configuration, when the image light enters the photosensor 200 in the first display region 11, it is not affected by the light emitted by the backlight module.

The backlight module of the electronic device 10K of this embodiment also has other light emission configurations in the camera mode. Taking FIG. 6B as an example, the backlight module does not emit light in the part corresponding to the first display region 11. The backlight module may emit light in the part corresponding to the second display region 13, but does not emit light in the part corresponding to a third display region 15 close to the upper edge of the second display region 13. In this embodiment, the third display region 15 is defined as a part of the display panel 100 close to the upper edge, and the third display region 15 may overlap with part of the second display region 13 and/or overlap with the first display region 11. In other words, it is possible that the backlight module does not emit light in the part corresponding to the first display region 11 and the adjacent second display region 13.

Taking FIG. 6C as an example, the backlight module does not emit light in the first display region 11, but emits light in the second display region 13. In this embodiment, the part of the display panel 100 close to the upper edge may further define a fourth display region 17. The fourth display region 17 may overlap with part of the second display region 13 but does not overlap with the first display region 11, and the fourth display region 17 is disposed adjacent to the first display region 11. In this embodiment, the part of the backlight module overlapping with the fourth display region 17 may emit light, but the second display pixels 130' (for example, shown in FIG. 3A) in the fourth display region 17 are in an off state. Therefore, less light emitted by the backlight module passes through the second display pixels 130' in the fourth display region 17, and the second display pixels 130' are in a dark state.

With the above configuration, by controlling the backlight module or the display panel, the electronic device 10K can achieve excellent display quality or excellent quality of forming images.

Figures 7A, 7B:
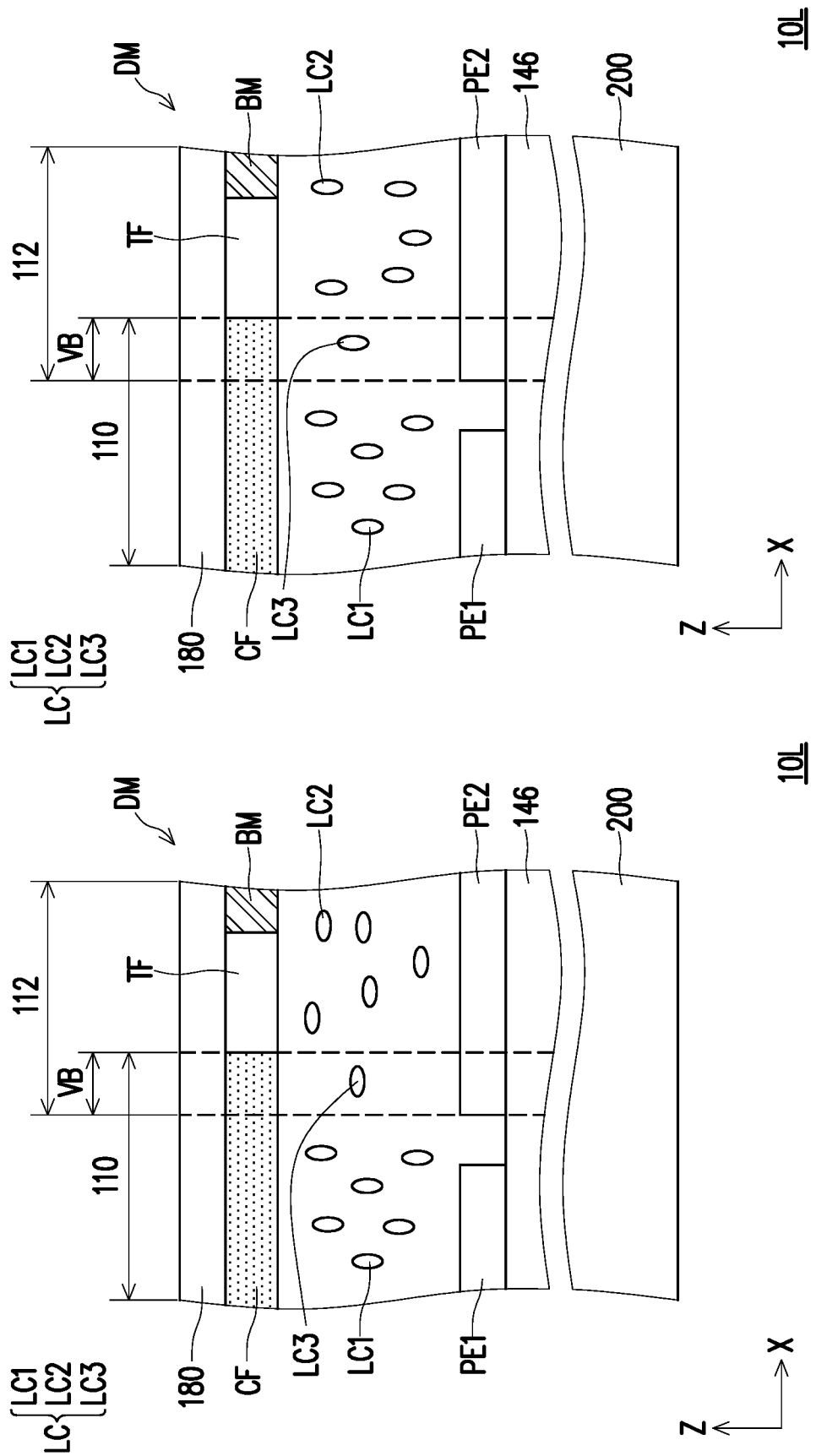
FIG. 7A is a schematic partially cross-sectional view of an electronic device in a display mode according to an embodiment of the disclosure.
FIG. 7B is a schematic partially cross-sectional view of an electronic device in the camera mode according to an embodiment of the disclosure.

FIG. 7A is a schematic partially cross-sectional view of an electronic device in the display mode according to an embodiment of the disclosure. FIG. 7B is a schematic partially cross-sectional view of an electronic device in the camera mode according to an embodiment of the disclosure. For clarity of the drawings and convenience of description, some components are not shown in FIG. 7A and FIG. 7B. Reference may be made to the above embodiments for descriptions of the same or similar components, which shall not be repeatedly described herein. In this embodiment, an electronic device 10L further includes a second substrate 180, a color filter layer CF, a light transmitting layer TF, and a light shielding layer BM. The color filter layer CF, the light transmitting layer TF, and the light shielding layer BM are respectively disposed on the second substrate 180. In this embodiment, the material of the second substrate 180 includes a transparent material, such as glass, quartz, or other suitable materials. The material of the color filter layer CF includes a colored photoresist or other suitable materials. The material of the light transmitting layer TF includes a transparent photoresist or other suitable materials. The material of the light shielding layer BM includes metal, a non-light-transmitting resin, or a non-light-transmitting photoresist, but is not limited thereto. In this embodiment, the second substrate 180 may serve as a color filter substrate but is not limited thereto.

In this embodiment, the electronic device 10L further includes a liquid crystal layer LC disposed between the insulating layer 146 on the first substrate (not shown) and the second substrate 180. The liquid crystal layer LC includes a plurality of liquid crystal molecules LC1, LC2, and LC3. As shown in FIG. 7A, the first display pixel 110 may include the color filter layer CF and a pixel electrode PE1, and the shutter pixel 112 may include the light transmitting layer TF and a pixel electrode PE2.

It noted that part of the shutter pixel 112 overlaps with the first display sub-pixel corresponding to the first display pixel 110. Specifically, in the Z-axis direction, the pixel electrode PE2 of the shutter pixel 112 partially overlaps with the color filter layer CF of the first display pixel 110. With the above configuration, the overlapped part may define an overlap region VB. In other words, the part of the pixel electrode PE2 overlapping with the color filter layer CF may define an overlap region VB. As shown in FIG. 7A, in the display mode, the pixel electrode PE1 of the first display pixel 110 may be electrically conducted. Therefore, the liquid crystal molecule LC1 corresponding to the first display pixel 110 may be rotated due to the electric field, and the light of the backlight module (not shown) can pass through the liquid crystal layer LC and the color filter layer CF along the Z axis direction. Meanwhile, the pixel electrode PE2 of the shutter pixel 112 is not electrically conducted. Therefore, the liquid crystal molecule LC2 corresponding to the shutter pixel 112 is not affected by the electric field and is not rotated, and the light of the backlight module (not shown) is absorbed by a polarizer (not shown). In addition, since the overlap region VB includes part of the pixel electrode PE2, the liquid crystal molecule LC3 corresponding to the overlap region VB is not rotated, either. Accordingly, the electronic device 10L can shield part of the light corresponding to the first display pixel 110 through the action of the liquid crystal molecule LC3 in the overlap region VB. In other words, in the display mode, the liquid crystal molecule LC3 corresponding to the overlap region VB can have an application as a light shielding layer to produce an effect similar to the black matrix (BM) around the sub-pixel. With the above configuration, the electronic device 10L exhibits excellent display quality.

As shown in FIG. 7B, in the camera mode, both the pixel electrode PE1 of the first display pixel 110 and the pixel electrode PE2 of the shutter pixel 112 may be electrically conducted. Therefore, the liquid crystal molecule LC1 corresponding to the first display pixel 110 and the liquid crystal molecule LC2 corresponding to the shutter pixel 112 may both be rotated due to the electric field, and the external light can pass through the shutter pixel 112, and the photosensor 200 can collect the external light for imaging.

FIG. 8A is a schematic cross-sectional view of an electronic device in the display mode according to an embodiment of the disclosure. FIG. 8B is a schematic cross-sectional view of an electronic device in the camera mode according to an embodiment of the disclosure. For clarity of the drawings and convenience of description, some components are not shown in FIG. 8A and FIG. 8B. Reference may be made to the above embodiments for descriptions of the same or similar components, which shall not be repeatedly described herein. In this embodiment, an electronic device 10M includes a backlight module 300, an optical component 400, and a display panel 100. The backlight module 300 and the optical component 400 are respectively disposed under the display panel 100. In this embodiment, the optical component 400 is disposed between the backlight module 300 and the display panel 100. The photosensor 200 is disposed between the backlight module 300 and the optical component 400, and the optical component 400 is disposed between the photosensor 200 and the display panel 100. In this embodiment, the photosensor 200 corresponds to the first display region 11 of the display panel 100 in the Z axis direction.

In this embodiment, the optical component 400 is, for example, an optical layer 410. The optical layer 410 can adjust the direction of travel of light, and the material of the optical layer 410 may include a polymer-dispersed liquid crystal (PDLC) film but is not limited thereto. As shown in FIG. 8A, a light L1 emitted by the backlight module 300 may enter the optical layer 410 along the Z axis direction, and a light L1' is blocked by the photosensor 200. Therefore, at the portion overlapping with the first display region 11, the user cannot observe the light L1' emitted by the backlight module 300 when observing the display panel 100 in the Z axis direction.

It is noted that when the electronic device 10M is in a display mode DM, the optical layer 410 (polymer-dispersed liquid crystal film) is not electrically conducted, and multiple interfaces are present in the optical layer 410. Therefore, part of the light L1 can pass through the optical layer 410, enter the display panel 100, and then pass through the display panel 100 to form an image. Part of the light L1 may be refracted as a light L2 in the optical layer 410, and the light L2 may be refracted to the part of the optical layer 410 corresponding to the first display region 11. Next, the light L2 may be emitted from the optical layer 410 as a light L3, which then enters the first display region 11 of the display panel 100 along the Z axis direction. Thereby, the light L3 can pass through the display panel 100 to form an image in the first display region 11. Accordingly, when the user observes the display panel 100 in the Z axis direction, the image can be observed in both the first display region 11 and the second display region 13. Therefore, the electronic device 10M can exhibit excellent display quality.

In addition, when the electronic device 10M is in a camera mode CM, the optical layer 410 may be electrically conducted, and after being emitted from the backlight module 300, the light L1 can pass through the optical layer 410 in the Z axis direction and enter the display panel 100. The light L1' is blocked by the photosensor 200, so no light is emitted from the first display region 11. An image light IM may pass through the first display region 11 of the display panel 100 in the Z axis direction, and then pass through the optical layer 410 to enter the photosensor 200. Therefore, the electronic device 10M can exhibit excellent quality of forming images.

Figure 9B:
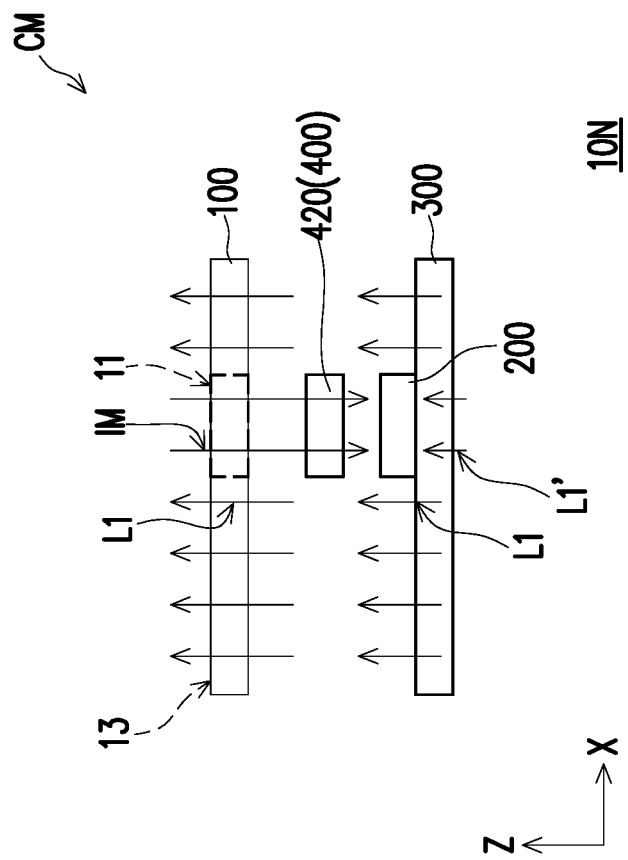
FIG. 9B is a schematic cross-sectional view of an electronic device in the camera mode according to an embodiment of the disclosure.
Figure 9A:
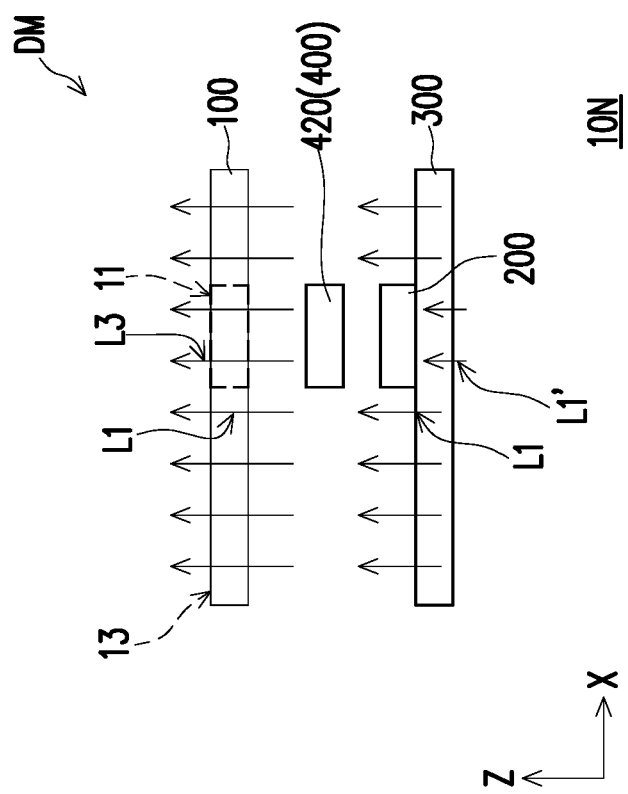
FIG. 9A is a schematic cross-sectional view of an electronic device in the display mode according to an embodiment of the disclosure.

FIG. 9A is a schematic cross-sectional view of an electronic device in the display mode according to an embodiment of the disclosure. FIG. 9B is a schematic cross-sectional view of an electronic device in the camera mode according to an embodiment of the disclosure. For clarity of the drawings and convenience of description, some components are not shown in FIG. 9A and FIG. 9B. An electronic device 10N of this embodiment is substantially similar to the electronic device 10M of FIG. 8A and FIG. 8B, so the same and similar components in the two embodiments will not be repeatedly described herein. This embodiment differs from the electronic device 10M mainly in that the optical component 400 is, for example, a light-emitting unit 420. The light-emitting unit 420 includes a white LED but is not limited thereto. In this embodiment, the light-emitting unit 420 overlaps with the first display region 11 and is located between the display panel 100 and the photosensor 200, and the light-emitting unit 420 has light-transmitting properties.

When the electronic device 10N is in the display mode DM (i.e., the light-emitting unit 420 is in a light-emitting state), a light L1' emitted by the backlight module 300 is blocked by the photosensor 200, so a light L3 emitted by the light-emitting unit 420 may enter the first display region 11 of the display panel 100. Accordingly, when the user observes the display panel 100 in the Z axis direction, the image can be observed in both the first display region 11 and the second display region 13. Therefore, the electronic device 10N can exhibit excellent display quality.

When the electronic device 10N is in the camera mode CM (i.e., the light-emitting unit 420 is in a non-light-emitting (transparent) state), a light L1' is blocked by the photosensor 200, and no light is emitted from the first display region 11. An image light IM may pass through the first display region 11 of the display panel 100 in the Z axis direction, and then pass through the light-emitting unit 420 which has light-transmitting properties to enter the photosensor 200. Therefore, the electronic device 10N can exhibit excellent quality of forming images.

In some embodiments, the light-emitting unit 420 may further include a plasma unit, but this embodiment is not limited thereto.

Figure 10:
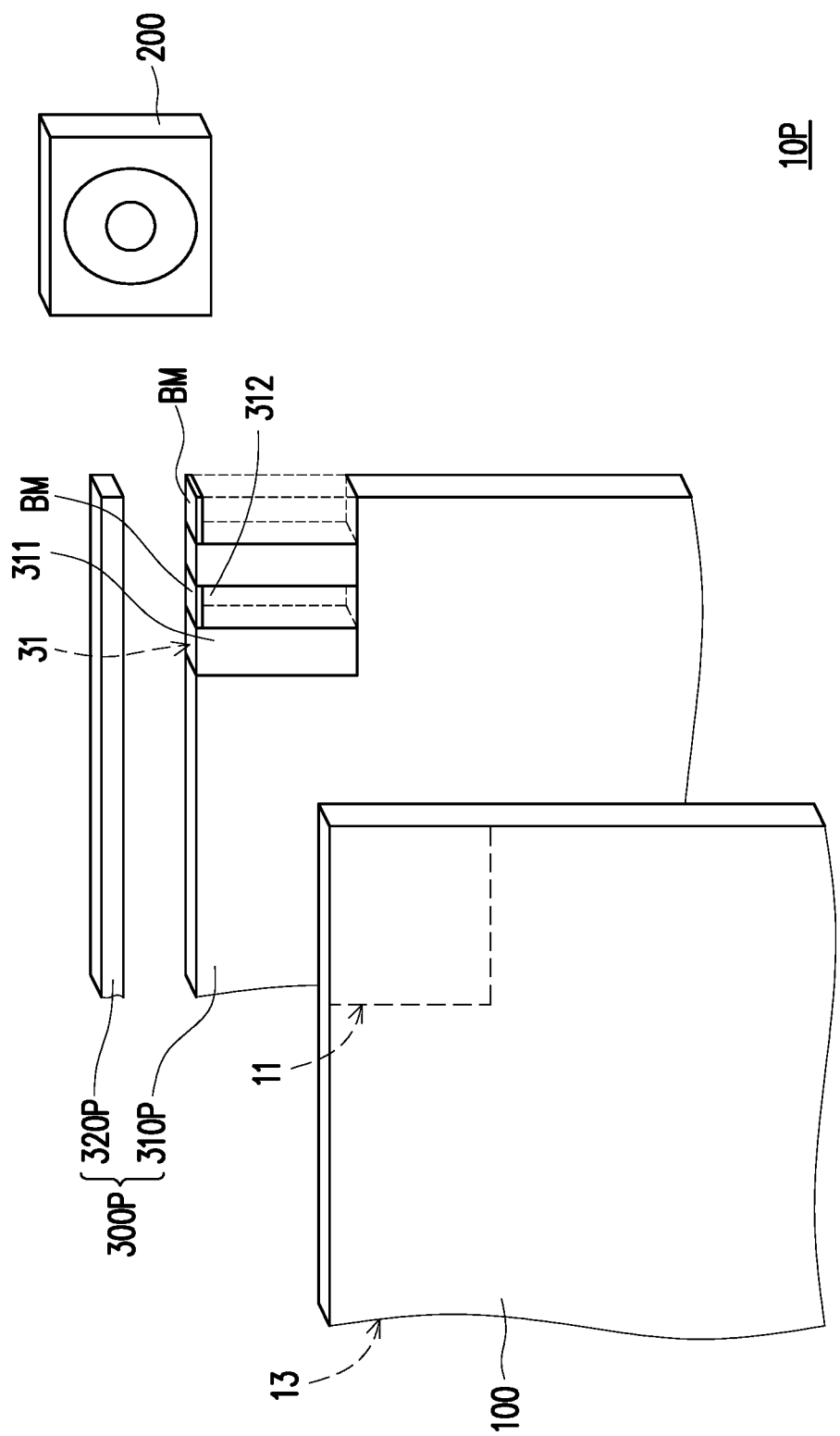
FIG. 10 is an exploded perspective view of an electronic device according to an embodiment of the disclosure.

FIG. 10 is an exploded perspective view of an electronic device according to an embodiment of the disclosure. For clarity of the drawings and convenience of description, some components are not shown in FIG. 10. Reference may be made to the above embodiments for descriptions of the same or similar components, which shall not be repeatedly described herein. In this embodiment, an electronic device 10P includes a backlight module 300P. The backlight module 300P is disposed corresponding to the display panel 100, and the backlight module 300P is disposed between the photosensor 200 and the display panel 100. The backlight module 300P includes a light guide plate 310P and a light source 320P. The light source 320P may include, for example, a light-emitting diode (LED) but is not limited thereto. The light guide plate 310P of the backlight module 300P has an optical region 31 corresponding to the first display region 11 or the photosensor 200. The optical region 31 includes a light guide region 311 and a light-transmitting region 312. The light transmittance of the light-transmitting region 312 may be greater than the light transmittance of the light guide region 311. For example, the light-transmitting region 312 may include a transparent material. The light guide region 311 and the light-transmitting region 312 may be alternately disposed in the optical region 31, but are not limited thereto. In some embodiments, the light guide region 311 may be disposed corresponding to the first display pixels, and the light-transmitting region may be disposed corresponding to the shutter pixels, but the disclosure is not limited thereto.

In this embodiment, the light guide region 311 may project the light emitted by the light source 320P into the display panel 100 to be emitted from the first display region 11. A light shielding layer BM may be disposed between the light-transmitting region 312 and the light source 320P, but is not limited thereto. With the above configuration, the backlight module 300P can provide the light source required by the electronic device 10P. Accordingly, an image can be displayed in both the first display region 11 and the second display region 13 of the electronic device 10P. Therefore, the electronic device 10P can exhibit excellent display quality.

It is noted that since the light transmittance of the light-transmitting region 312 may be greater than the light transmittance of the light guide region 311, the image light from the outside can pass through the light-transmitting region 312 in the first display region 11 to enter the photosensor 200. In some embodiments, the light shielding layer BM may absorb or block the light from the light source 320P. With the above configuration, the interference caused by the light from the light source 320P can be reduced. Therefore, the electronic device 10P can exhibit excellent quality of forming images.

Figure 11:
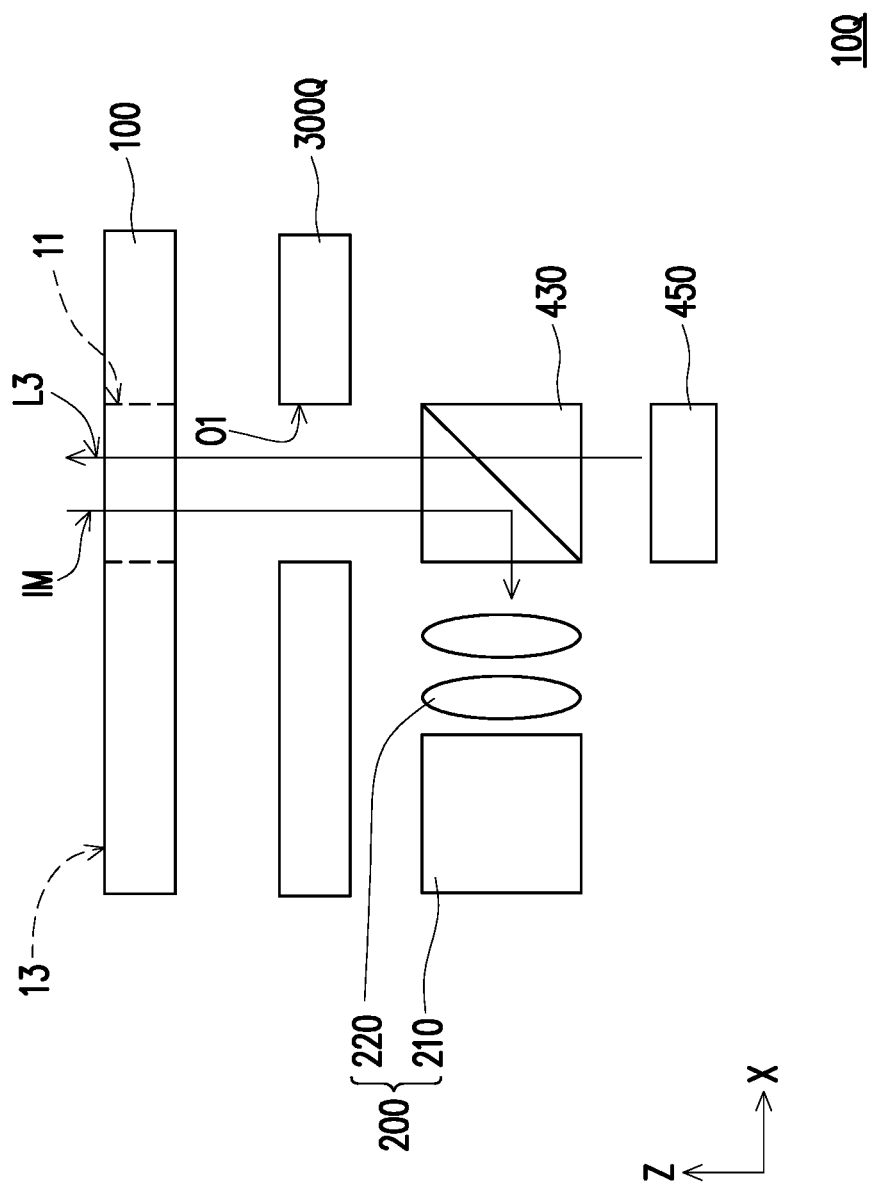
FIG. 11 is a schematic cross-sectional view of an electronic device according to an embodiment of the disclosure.

FIG. 11 is a schematic cross-sectional view of an electronic device according to an embodiment of the disclosure. For clarity of the drawings and convenience of description, some components are not shown in FIG. 11. Reference may be made to the above embodiments for descriptions of the same or similar components, which shall not be repeatedly described herein. In this embodiment, an electronic device 10Q further includes a beam splitter 430 and a light-emitting unit 450. For example, a backlight module 300Q is disposed between the display panel 100 and the photosensor 200. In the Z axis direction, the backlight module 300Q has an opening O1 corresponding to the first display region 11. In addition, in the Z axis direction, the beam splitter 430 is disposed corresponding to the opening O1, and the opening O1 is located between the display panel 100 and the beam splitter 430. In the Z axis direction, the light-emitting unit 450 is disposed corresponding to the first display region 11 and the beam splitter 430, and the beam splitter 430 is located between the backlight module 300Q and the light-emitting unit 450. In other words, the opening O1, the beam splitter 430, and the light emitting unit 450 overlap with the first display region 11.

In this embodiment, the photosensor 200 overlaps with the second display region 13 and does not overlap with the first display region 11 in the Z axis direction. The photosensor 200 is disposed adjacent to the beam splitter 430. In this embodiment, the photosensor 200 is, for example, a camera module and includes a camera 210 and a lens group 220. With the above configuration, a light L3 emitted by the light-emitting unit 450 can pass through the beam splitter 430 along the Z axis direction, and pass through the opening O1 and then enter the first display region 11 of the display panel 100. Accordingly, the light L3 can form an image in the first display region 11. In addition, an image light IM from the outside may pass through the first display region 11 along the Z axis direction, and pass through the opening O1 and then enter the beam splitter 430. After being refracted, the image light IM may pass through the lens group 220 to enter the camera 210. Accordingly, the image light IM can be imaged on the photosensor 200. Therefore, the electronic device 10Q may exhibit excellent display quality or excellent quality of forming images.

In some embodiments, the photosensor 200 may also be disposed under the beam splitter 430, and the light-emitting unit 450 may be disposed under the backlight module 300Q and overlap with the second display region 13. In the above embodiment, the image light IM may pass through the beam splitter 430 in the Z axis direction and then enter the photosensor 200. The light emitted by the light-emitting unit 450 may enter the beam splitter in the X axis direction, be refracted, and then travel in the Z axis direction to enter the first display region 11. Thereby, an excellent technical effect similar to the above embodiment can be obtained. With the above configuration, the photosensor 200 may overlap with the first display region 11 or the second display region 13. Therefore, the electronic device 10Q of this embodiment provides flexibility in design.

In summary of the above, in the electronic device of the embodiment of the disclosure, the first display region has the first display sub-pixels for display and the shutter pixels having good light transmittance. Therefore, the first display region has a display function, and the electronic device has a high screen-to-body ratio. In addition, the photosensor disposed under the display panel can receive image light of good quality and exhibit excellent quality of forming images. Also, the electronic device of the disclosure can adjust the arrangement or the area ratio of the first display sub-pixels and the shutter pixels in the first display region. Therefore, the electronic device can achieve a balance between display quality and quality of forming images, and the electronic device has a high screen-to-body ratio and exhibits excellent display quality or excellent quality of forming images. Moreover, the electronic device of the disclosure can also electrically connect the shutter pixels through the first conductive wiring to achieve the display effect of row inversion, column inversion, or dot inversion. Furthermore, the electronic device of the disclosure can also achieve excellent display quality or excellent quality of forming images through the driving method of the backlight module. In addition, the shutter pixels of the electronic device of the disclosure may partially overlap with the first display sub-pixels to achieve the application of using liquid crystal molecules as a light shielding layer, and the electronic device exhibits excellent display quality. Moreover, the electronic device of the disclosure also provides an application in which the photosensor overlaps with the first display region or the second display region, which makes the design flexible.

Finally, it should be noted that the foregoing embodiments are merely used for describing the technical solutions of the disclosure, but are not intended to limit the disclosure. Although the disclosure has been described in detail with reference to the foregoing embodiments, a person of ordinary skill in the art should understand that, modifications may still be made to the technical solutions in the foregoing embodiments, or combinations or equivalent replacements may be made to part or all of the technical features; and these modifications, combinations, or replacements will not cause the essence of corresponding technical solutions to depart from the scope of the technical solutions in the embodiments of the disclosure.

What is claimed is:

1. An electronic device, comprising:
   a photosensor; and
   a display panel disposed on the photosensor and comprising:
      a first display region, wherein in a top view, the first display region overlaps the photosensor; and
      a second display region disposed adjacent to the first display region;
   wherein the first display region has a plurality of first display sub-pixels, and the second display region has a plurality of second display sub-pixels,
   wherein each of the plurality of first display sub-pixels comprises only one color LED, and each of the plurality of second display sub-pixels comprises only one color LED, and
   wherein a size of one of the first display sub-pixels is greater than a size of one of the second display sub-pixels, and a gap between two adjacent ones of the first display sub-pixels is greater than a gap between two adjacent ones of the second display sub-pixels in a first direction,
   wherein a gap between two adjacent ones of the first display sub-pixels is greater than a gap between two adjacent ones of the second display sub-pixels in a second direction perpendicular to the first direction.

2. The electronic device according to claim 1, wherein the first display region further comprises a plurality of shutter pixels, and in the top view, an area of one of the plurality of shutter pixels is greater than an area of one of the plurality of first display sub-pixels.

3. The electronic device according to claim 1, wherein the first display region further comprises a plurality of shutter pixels, and one of the plurality of shutter pixels is disposed between two adjacent ones of the plurality of first display sub-pixels.

4. The electronic device according to claim 1, wherein the first display region further comprises a plurality of shutter pixels, and in the first display region, at least three of the plurality of first display sub-pixels form a first display pixel, and at least one of the plurality of shutter pixels is disposed adjacent to the first display pixel.

5. The electronic device according to claim 4, wherein the first display region further comprises a plurality of shutter pixels, and in the first display region, a ratio of a number of the plurality of shutter pixels to a number of the first display pixels is 1:25 to 25:1.

6. The electronic device according to claim 4, wherein the first display region further comprises a plurality of shutter pixels, and in the first display region, a ratio of a total area of the plurality of shutter pixels to a total area of the first display pixels is 1:25 to 25:1.

7. The electronic device according to claim 1, wherein the electronic device further comprises a first conductive wiring, the first display region further comprises a plurality of shutter pixels, and the first conductive wiring has a polarity, and the plurality of shutter pixels have the same polarity.

8. The electronic device according to claim 7, further comprising another first conductive wiring, wherein the first conductive wiring is electrically connected to one of two adjacent shutter pixels, the another first conductive wiring is electrically connected to another one of the two adjacent shutter pixels, and the two adjacent shutter pixels respectively have different polarities.

9. The electronic device according to claim 1, wherein the first display region further comprises a plurality of shutter pixels, and at least one of the plurality of shutter pixels partially overlaps with at least one of the plurality of first display sub-pixels.

10. The electronic device according to claim 1, further comprising a backlight module and an optical component respectively disposed under the display panel, wherein the photosensor is disposed between the backlight module and the optical component, and the optical component is disposed between the photosensor and the display panel.

11. The electronic device according to claim 1, further comprising a backlight module disposed under the display panel, wherein the backlight module is disposed between the photosensor and the display panel, the backlight module has an optical region corresponding to the first display region, the optical region further has a light guide region and a light-transmitting region, and a light transmittance of the light-transmitting region is greater than a light transmittance of the light guide region.

12. The electronic device according to claim 1, wherein the second display region surrounds the first display region.

13. The electronic device according to claim 1, wherein the photosensor comprises an optical camera, an infrared sensor, or a visible light sensor.

14. The electronic device according to claim 1, wherein the first display region further comprises a plurality of shutter pixels, and a light transmittance of any one of the shutter pixels is greater than a light transmittance of any one of the plurality of first display sub-pixels.

15. The electronic device according to claim 1, wherein at least three of plurality of second display sub-pixels form a second display pixel.

16. The electronic device according to claim 1, wherein the electronic device further comprises a first conductive wiring and a plurality of vias, the first display region further comprises a plurality of shutter pixels, and wherein the first conductive wiring is electrically connected to the at least one of the plurality of shutter pixels through one of the plurality of vias.

17. The electronic device according to claim 1, further comprising a first conductive wiring, wherein the first display region further comprises a plurality of shutter pixels, when the photosensor is performed, the first conductive wiring controls the at least one of the plurality of shutter pixels, and a light passes through the plurality of shutter pixels to reach the photosensor.

18. The electronic device according to claim 17, wherein when the electronic device is in a display mode, the first conductive wiring controls the at least one of the plurality of shutter pixels, and a light is absorbed or blocked by the plurality of shutter pixels and cannot reach the photosensor.

19. The electronic device according to claim 17, further comprising a backlight module, wherein when the photosensor is performed, the backlight module emits light in a part corresponding to the second display region, and the backlight module does not emit light in a part corresponding to the first display region.

* * * * *